United States Patent
Sun et al.

(10) Patent No.: US 11,474,069 B2
(45) Date of Patent: Oct. 18, 2022

(54) OPEN-JUNCTION IONIC TRANSISTOR

(71) Applicant: Seoul National University R&DB Foundation, Seoul (KR)

(72) Inventors: Jeong-Yun Sun, Seoul (KR); Young-Chang Joo, Seoul (KR); Taek Dong Chung, Dobong-gu (KR); Hae-Ryung Lee, Seoul (KR); Seung-Min Lim, Seoul (KR); Seok Hee Han, Namyangju-si (KR); Hyunjae Yoo, Seongnam-si (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 215 days.

(21) Appl. No.: 16/887,895

(22) Filed: May 29, 2020

(65) Prior Publication Data
US 2020/0378918 A1    Dec. 3, 2020

(30) Foreign Application Priority Data
May 30, 2019 (KR) .......................... 10-2019-0064011

(51) Int. Cl.
    *G01N 27/414*    (2006.01)
(52) U.S. Cl.
    CPC .................................. *G01N 27/414* (2013.01)
(58) Field of Classification Search
None
See application file for complete search history.

(56) References Cited

U.S. PATENT DOCUMENTS

2017/0122905 A1\* 5/2017 Kobayashi ....... G01N 27/44791

FOREIGN PATENT DOCUMENTS

| JP | 2014045193 | 3/2014 |
|---|---|---|
| KR | 100581966 | 5/2006 |
| KR | 1020110021230 | 3/2011 |
| KR | 1020160139354 | 12/2016 |
| WO | 2014017535 | 1/2014 |

(Continued)

OTHER PUBLICATIONS

Daryl R. Kipke, et al., "Advanced Neurotechnologies for Chronic Neural Interfaces: New Horizons and Clinical Opportunities", J. Neurosci., vol. 28, (2008), 11830-11838.

(Continued)

*Primary Examiner* — Erik Kielin
(74) *Attorney, Agent, or Firm* — Cantor Colburn LLP

(57) ABSTRACT

Disclosed is an open-junction ionic transistor which includes: a substrate; a p type gel which is formed as a polyelectrolyte gel on the substrate; an n type gel which is formed as the polyelectrolyte gel on the substrate and having one side contacting one side of the p type gel; a first reservoir contacting the other side of the p type gel; a second reservoir contacting the other side of the n type gel; and an encapsulation layer covering the p type gel, the n type gel, the first reservoir, and the second reservoir, in which on the encapsulation layer, an injection unit for injecting an ion input is formed at a location corresponding to an interface contacting the p type gel and the n type gel and when reverse bias voltage is applied between the p type gel and the n type gel, the ion input injected through the injection unit is amplified and ionic current peak is generated.

20 Claims, 27 Drawing Sheets

(56) References Cited

FOREIGN PATENT DOCUMENTS

WO 2017157729 9/2017

OTHER PUBLICATIONS

Dobromir Rahnev, et al., "Attention induces conservative subjective biases in visual perception", Nat. Neurosci., (2011), vol. 14, No. 12, pp. 1-19.

Gongchen Sun, et al., High-Flux Ionic Diodes, Ionic Transistors and Ionic Amplifiers Based on External Ion Concentration Polarization by an Ion Exchange Membrane: A New Scalable Ionic Circuit Platform, Lab Chip, (Apr. 7, 2016), vol. 16 No. 7; pp. 1171-1177.

Jeong-Yun Sun, et al., "Highly stretchable and tough hydrogels", Nature, (2012), vol. 489, pp. 133-136.

Ji-Hyung Han, et al., "Ion Flow Crossing Over a Polyelectrolyte Diode on a Microfl uidic Chip", Small, (2011), vol. 7, No. 18, pp. 2629-2639.

Ji-Hyung Han, et al., "Ionic Circuits Based on Polyelectrolyte Diodes on a Microchip", Angew. Chem. Int. Ed., (2009), vol. 48, pp. 3830-3833.

Toshikazu Ono, et al., "Lipophilic polyelectrolyte gels as superabsorbent polymers for nonpolar organic solvents", Nature Materials, (2007), vol. 6, pp. 429-433.

Klas Tybrandt, et al., "Toward Complementary Ionic Circuits: The npn Ion Bipolar Junction Transistor", J. Am. Chem. Soc , (2011), vol. 133, pp. 10141-10145.

Klas Tybrandta, et al., "Ion bipolar junction transistors", PNAS, Jun. 1, 2010, vol. 107, No. 22, pp. 9929-9932.

Kwang Bok Kim, et al., "Polyelectrolyte junction field effect transistor based on microfluidic chip", Applied Physics Letters, (2010), vol. 96, pp. 1-4.

Logic gates based on ion transistors, Posted May 29, 2012, pp. 1-6, Retrieved from the Internet May 29, 2020<URL:www.nature.com/naturecommunications>.

Max C. Darnell, et al., "Performance and biocompatibility of extremely tough alginate/polyacrylamide hydrogels", Biomaterials, (2013), vol. 34, pp. 8042-8048.

Olivier J. Cayre, et al., "Polyelectrolyte Diode: Nonlinear Current Response of a Junction between Aqueous Ionic Gels", J. Am. Chem. Soc., (2007), vol. 129, pp. 10801-10806.

Theresia Arbring Sjöström, et al., "A Decade of Iontronic Delivery Devices", Adv. Mater. Technol., (2018), pp. 2-10.

* cited by examiner $$V = \frac{4\pi r^3}{3}$$

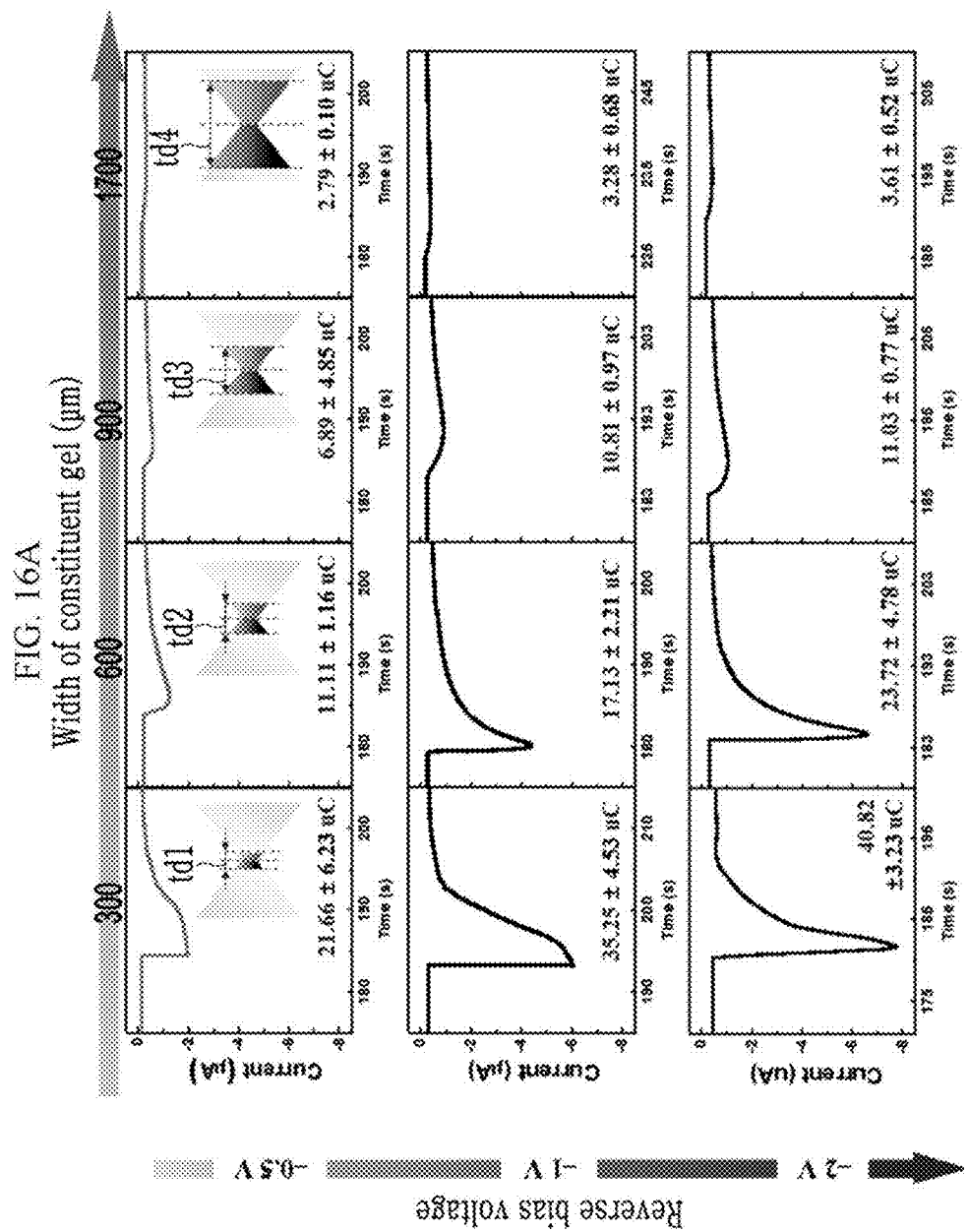

OPEN-JUNCTION IONIC TRANSISTOR

CROSS-REFERENCE TO RELATED APPLICATION

This application claims priority to and the benefit of Korean Patent Application No. 10-2019-0064011 filed in the Korean Intellectual Property Office on May 30, 2019, the entire contents of which are incorporated herein by reference.

BACKGROUND

(a) Technical Field

The present disclosure relates to an open-junction ionic transistor.

(b) Description of the Related Art

Recently, various attempts have been made to obtain bio signals by inserting electronic devices into a body. However, conventional electronic devices based on metals and semiconductors are low in biocompatibility in terms of materials, and our bodies are basically based on a signal transmission system based on the flow of ions instead of electrons, and as a result, there is a fundamental problem due to system inconsistency in terms of signal exchange. Accordingly, it is necessary to develop a new type of device capable of directly receiving and interpreting a signal transmitted from a biological system beyond limitations of the conventional electronic devices.

The above information disclosed in this Background section is only for enhancement of understanding of the background of the invention and therefore it may contain information that does not form the prior art that is already known in this country to a person of ordinary skill in the art.

SUMMARY

The present disclosure has been made in an effort to provide an open-junction ionic transistor capable of amplifying a signal transmitted from a biological system.

An exemplary embodiment of the present invention provides an open-junction ionic transistor including: a substrate; a p type gel formed by a polyelectrolyte gel on the substrate; an n type gel formed by the polyelectrolyte gel on the substrate and having one surface contacting one surface of the p type gel; a first reservoir contacting the other surface of the p type gel; a second reservoir contacting the other surface of the n type gel; and an encapsulation layer covering the p type gel, the n type gel, the first reservoir, and the second reservoir. When on the encapsulation layer, an injection unit for injecting an ion input is formed at a location corresponding to a boundary region contacting the p type gel and the n type gel and reverse bias voltage is applied between the p type gel an the n type gel, the ion input injected through the injection unit is amplified and ionic current peak is generated.

Another exemplary embodiment of the present invention provides an open-junction ionic transistor including: a p type gel which is a polyelectrolyte; an n type gel which contacts one side of the p type gel and which is the polyelectrolyte; a first reservoir contacting the other side of the p type gel facing one side of the p type gel; and a second reservoir contacting the other side of the n type gel facing one side contacting the p type gel, in which a depletion region by reverse bias voltage is formed in the p type gel and the n type gel and ionic current peak is generated by additional ions introduced from the first reservoir and the second reservoir by the ion input injected into the depletion region.

The open-junction ionic transistor may further include an encapsulation layer covering the p type gel, the n type gel, the first reservoir, and the second reservoir, and the ion input may be injected through an injection unit formed on the encapsulation layer. A location of the injection unit may be positioned in a region corresponding to an interface contacting the p type gel and the n type gel.

As the reverse bias voltage increases, the ionic current peak may increase.

The ionic current peak may be changed according to a type of ion input. When cations of the ion input are hydrated, as a radius of the hydrated cation is smaller, the ionic current peak may increase.

The ionic current peak may be changed according to ion concentrations of the first reservoir and the second reservoir.

The ionic current peak may be changed according to ion types of the first reservoir and the second reservoir. When the cations of the first reservoir and the second reservoir are hydrated, as the radius of the hydrated cation is smaller, the ionic current peak may increase.

As widths of the p type gel and the n type gel are smaller, the ionic current peak may increase. As the widths of the p type gel and the n type gel are smaller, an operating speed may increase.

Yet another exemplary embodiment of the present invention provides an open-junction ionic transistor including: a reservoir; a p type gel which is a polyelectrolyte gel positioned in the reservoir; and an n type gel which is positioned in the reservoir and which is a gel contacting one side of the p type gel, in which a depletion region by reverse bias voltage is formed in the p type gel and the n type gel and ionic current peak is generated by additional ions introduced from the reservoir by the ion input injected into the depletion region, and the p type gel and the n type gel are polyanionic hydrogel or polymer backbones of the p type gel and the n type gel have fixed negative charges. The p type gel may be composed by any one of poly 3-sulfopropyl acrylate potassium salt, poly vinylsulfonic acid (pVSA), poly styrene sulfonic acid (pSS), and poly 2-acrylamide-2-methyl-1-propanesulfonic acid (pAMPSA), poly acrylic acid (pAAc), hyaluronic acid (HA), alginate and the n type gel may be composed by any one of poly diallyl-dimethylammonium chloride (pDADMAC), poly N-[3-(N, N-dimethylamino) propyl] acrylamide methyl chloride quarternary (pDMAPAA-Q), and poly(2-[acryloyloxy ethyl] trimethyl ammonium chloride (pAETMAC), chitosan.

An open-junction ionic transistor is provided, which is capable of generating an ion output by amplifying an ion input.

BRIEF DESCRIPTION OF THE DRAWINGS

FIG. 16A is a waveform diagram illustrating ionic current peak according to a change in ionic transistor width and a change in reverse bias voltage and FIG. 16B is a graph showing an amplification ratio according to a change in ionic transistor width and a change in reverse bias voltage.

DETAILED DESCRIPTION OF THE EMBODIMENTS

Figure 1:
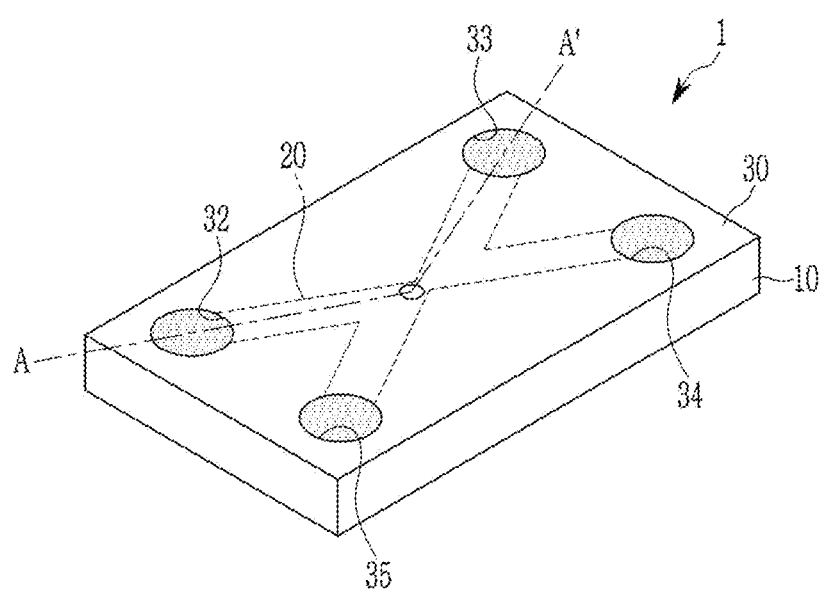
FIG. 1 is a perspective view illustrating an open-junction ionic transistor according to an exemplary embodiment.

In the present disclosure, with an open-junction ionic transistor including a structure providing an ion input, the ion input is amplified to generate an ion output. For example, an ion signal depending on the ion input is amplified through the open-junction ionic transistor and an ion flow increases between a p type gel and an n type gel of the open-junction ionic transistor, and as a result, ionic current peak by the amplified ion flow flows.

In the present disclosure, the structure providing the ion input is defined as an "open junction structure". This as a term for helping understanding the invention described through the present disclosure does not limit the present invention. Specifically, an open junction structure is designed in an encapsulation layer of microfluidic chip based polyelectrolyte gel diodes and an ion input inputted from the outside, i.e., the ion signal is directly transferred to the P-N junction and amplified through the open-junction ionic transistor, and as a result, the ion output displayed as the ionic current peak is generated. In this case, the open-junction ionic transistor is under a reverse bias condition.

Further, in the present disclosure, as factors for controlling an amplification performance of the open-junction ionic transistor, the ion input, a reverse bias voltage, and parameters constituting the open-junction ionic transistor will be described and a relationship between the corresponding factors and the amplification performance of the open-junction ionic transistor will be described through exemplary embodiments of the present invention. An operating principle of the open-junction ionic transistor and a technical effect generated from a difference of the operating principle will be described through various exemplary embodiments introduced in the present disclosure.

Hereinafter, exemplary embodiments disclosed in this specification will be described in detail with reference to the accompanying drawings and the same or similar components are denoted by the same or similar reference numerals, and duplicated description thereof will be omitted. Further, in describing an exemplary embodiment disclosed in the present disclosure, a detailed description of related known technologies will be omitted if it is determined that the detailed description makes the gist of the exemplary embodiment of the present disclosure unclear. Further, it is to be understood that the accompanying drawings are just used for easily understanding the exemplary embodiments disclosed in this specification and a technical spirit disclosed in this specification is not limited by the accompanying drawings and all changes, equivalents, or substitutes included in the spirit and the technical scope of the present invention are included.

Hereinafter, exemplary embodiments referring to drawings are used for describing the present invention and do not limit the present invention.

FIG. 1 is a perspective view illustrating an open-junction ionic transistor according to an exemplary embodiment.

Figure 2:
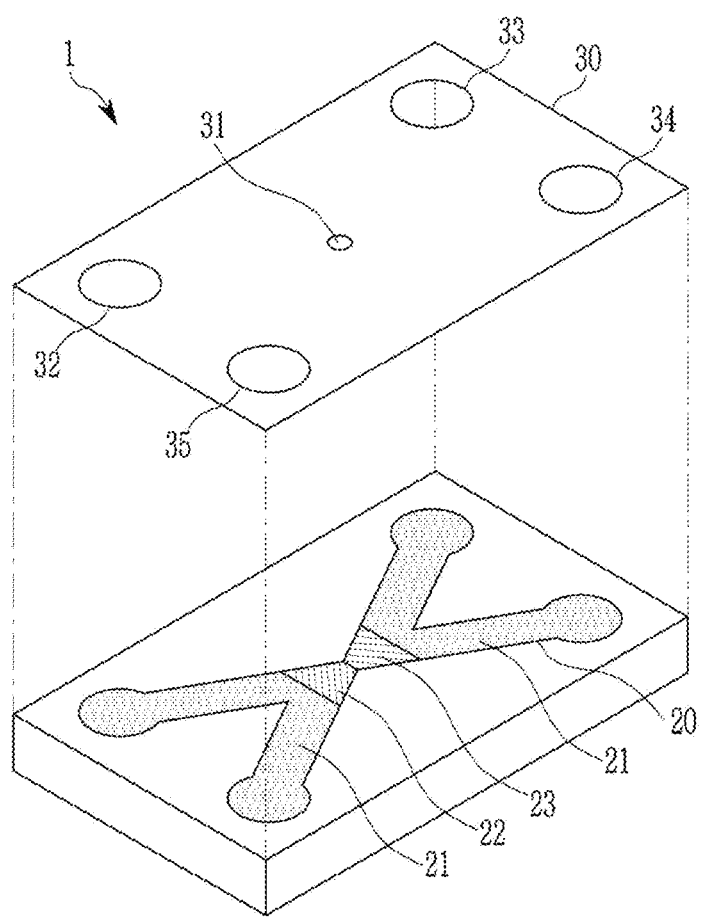
FIG. 2 is an exploded view of the open-junction ionic transistor illustrated in FIG. 1.
Figure 3:
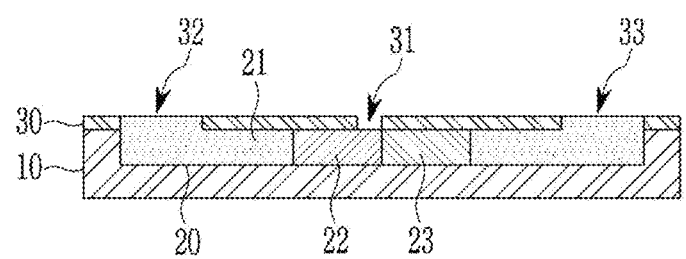
FIG. 3 is a cross-sectional view taken along line A-A' in FIG. 1.
Figure 4:
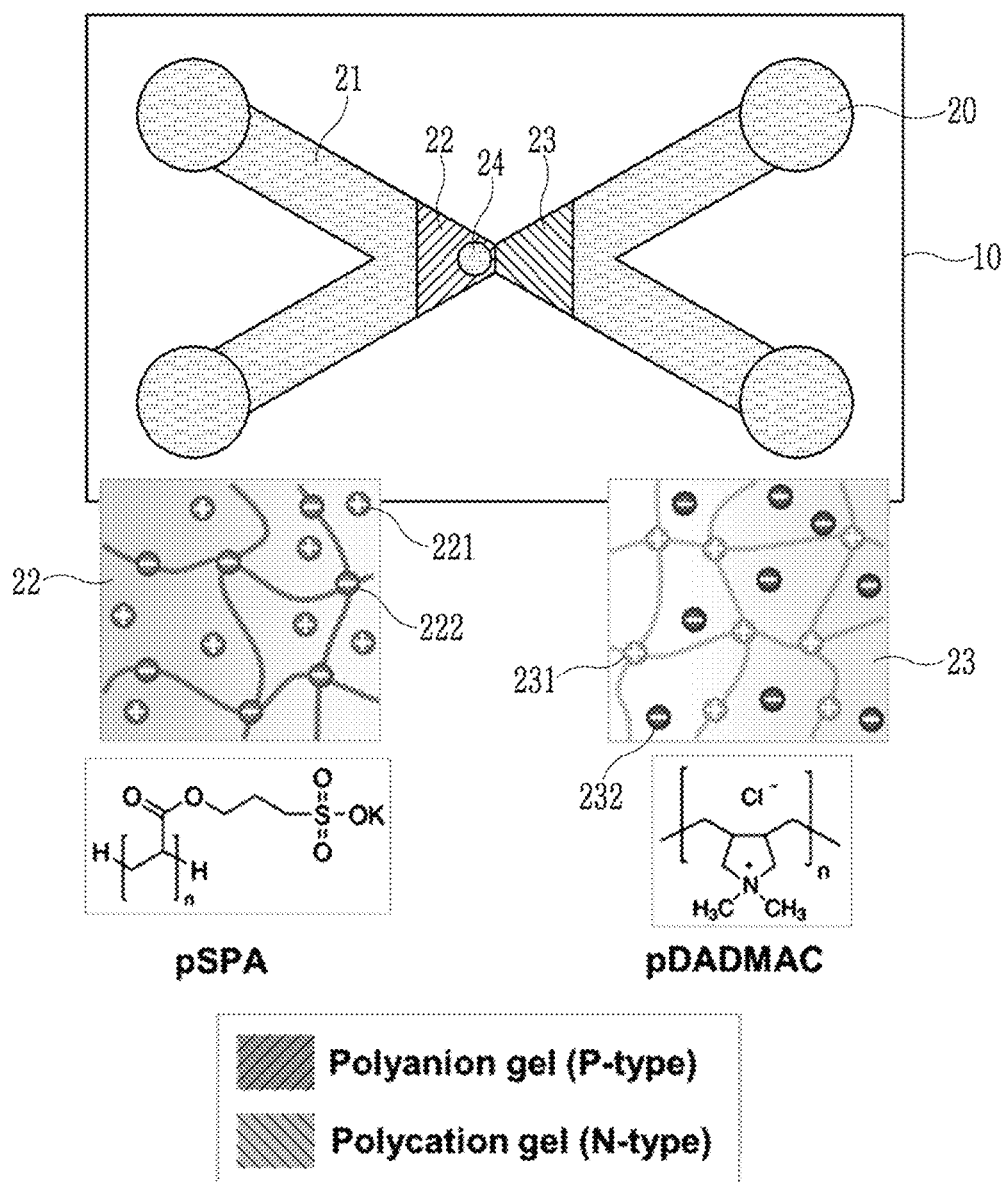
FIG. 4 is a plan view of an open-junction ionic transistor excluding an encapsulation layer in the exploded view of FIG. 2.

FIG. 2 is an exploded view of the open-junction ionic transistor illustrated in FIG. 1, FIG. 3 is a cross-sectional view taken along line A-A' in FIG. 1, and FIG. 4 is a plan view of an open-junction ionic transistor excluding an encapsulation layer in the exploded view of FIG. 2.

The open-junction ionic transistor illustrated in FIGS. 1 to 4 may be changed according to a design as an example for describing an exemplary embodiment.

As illustrated in FIG. 1, an open-junction ionic transistor 1 includes a substrate 10 and an encapsulation layer 30 and as illustrated in FIGS. 2 to 4, the open-junction ionic transistor 1 further includes a channel 20 positioned on the substrate 10. An open junction hole 31 and four open holes 32 to 35 are formed in the encapsulation layer 30. The hole 31 is one example of an injection unit for injecting the ion input and the open holes 32 to 35 as components for electrical coupling, ionic coupling, etc., between the channel 20 and the outside have shapes of the holes in an exemplary embodiment, but the present invention is not limited thereto. Further, it is illustrated that an exemplary embodiment illustrated in FIG. 1 includes four open holes, but a number and a location may be changed according to a design.

In FIG. 1, as the component for injecting the ion input, the hole is illustrated, but the present invention is not limited thereto. Various modifications can be made in an open structure for injecting the ion input.

As illustrated in FIGS. 2 and 3, the channel 20 is formed on the substrate 10 and the channel 20 includes a reservoir 21, a p type gel 22, and an n type gel 23.

An ionic solution is filled in the channel 20 for dialysis and electrochemical contact of a polyelectrolyte gel and this is referred to as the reservoir 21.

As illustrated in FIGS. 2 to 4, in the channel 20, a p type gel 22 and an n type gel 23 form a p-n junction interface and the p type gel 22 is configured by a p type poly 3-sulfopropyl acrylate potassium salt (pSPA) polyelectrolyte gel, and the n type gel 23 may be configured by an n type poly diallyl-dimethylammonium chloride (pDADMAC) polyelectrolyte gel. In a fabrication process of the open-junction ionic transistor, the p type gel 22 and the n type gel 23 may be formed through UV photo-polymerization. 3-sulfopropyl acrylate potassium salt (SPA) as model number (CAS Number) 31098-20-1 of SIGMA Aldrich may have a molecular weight of 232.30 and diallyldimethylammonium chloride (DADMAC) as model number (CAS Number) 7398-69-8 of SIGMA Aldrich may have a molecular weight of 161.67.

In an exemplary embodiment, the p type gel 22 is implemented as poly 3-sulfopropyl acrylate potassium salt (pSPA) and the n type gel 23 is implemented as poly diallyl-dimethylammonium chloride (pDADMAC), but the present invention is not limited thereto and another material may be used, which has ion conductivity and ion selectivity capable of implementing the open-junction ionic transistor of the present invention after a completion time of the present invention in addition to at the completion time of the present invention.

The p type gel 22 and the n type gel 23 are polyanionic hydrogel or polymer backbones of the p type gel 22 having fixed negative charges and the n type gel 23 have fixed positive charges. For example, the p type gel 22 may be composed by any one of poly vinylsulfonic acid (pVSA), poly styrene sulfonic acid (pSS), and poly 2-acrylamide-2-methyl-1-propanesulfonic acid (pAMPSA), poly acrylic acid (pAAc), hyaluronic acid (HA), alginate. Further, the n type gel 23 may be composed by any one of poly N-[3-(N, N-dimethylamino)propyl] acrylamide methyl chloride quarternary (pDMAPAA-Q), and poly(2-[acryloyloxy ethyl] trimethyl ammonium chloride (pAETMAC), chitosan.

Hydrogels have a form in which water is contained in a network of hydrophilic polymer chains. In this case, when an internal solvent includes an electrolyte, since ions may be transferred while being capable of maintaining an appearance, the internal solvent is suitable as a conductor constituting an ionic device. In particular, in the case of the polyelectrolyte gel, which is one of the hydrogels, the polymer chain having only one type of charge of either positive or negative charge forms only a gel structure, and thus only the movement of ions having an opposite sign may be induced inside to match electrical neutrality.

As illustrated in FIG. 4, in the p type gel 22 implemented as the polyelectrolyte gel pSPA, negative charges 222 are tied to the polymer chains, and as a result, only positive charges 221 are movable. Further, in the n type gel 23 implemented as the polyelectrolyte gel pDADMAC, positive charges 231 are tied to the polymer chains, and as a result, only negative charges 232 are movable. As such, an ion selective property of the polyelectrolyte gel may form p type and n type gels which are similar forms to p and n type semiconductor materials and the open-junction ionic transistor 1 according to an exemplary embodiment may be implemented through a junction of the p and n type gels.

The encapsulation layer 30 may be manufactured by ultrathin borosilicate glass. Specifically, model D263 of SCHOTT, may be used. The hole 31 may be formed on the encapsulation layer 30 through a laser hole drilling process and a diameter thereof may be 30 um as 50 um or less. The thickness of the encapsulation layer 30 is very small and a difference between the surface of the polyelectrolyte gel and an upper surface of the encapsulation layer 30 is substantially small so as to be disregarded, and as a result, it is illustrated that the polyelectrolyte gel is filled up to the upper surface of the encapsulation layer 30 in FIG. 3.

In FIG. 4, a location 24 corresponding to the hole 31 illustrated in FIGS. 1 to 3 is illustrated with dotted lines, but the location of the hole 31 is not limited to a location 24 of FIG. 4.

Since a specific manufacturing method is a known technique in a technical field to which the present invention belongs to, a detailed description will be omitted.

The open-junction ionic transistor 1 according to an exemplary embodiment is implemented as a micro fluid chip and includes the hole 31 which is the open junction structure for injecting the ion input which is the ion solution into the channel 20. The hole 31 may be formed at a location corresponding to an interface between the p type gel 22 and the n type gel 23 by laser hole drilling using a KOS-SF1000RBS picosecond UV laser system of Kortherm Science and each of the open holes 32 to 35 may also be formed at a corresponding location by the same scheme.

The channel 20 according to an exemplary embodiment may be patterned to a glass-made substrate 10 using photolithography and a wet etching process. For example, 1 mm thick 3.hydrolytic grade soda lime slide glasses of may be used as the substrate 10. An organic residue on the surface of the substrate 10 is washed with a piranha solution (H2SO4:H2O=3:1) of J. T Baker and then slide glass is rinsed with deionized water and dehydrated on a hot plate at 175° C. for 10 minutes. With respect to the substrate 10, spin coating by ACE-200 of Dong-A Trading is performed together with hexamethyl-disilazane (HMDS) and AZ4620 photo-resist (PR) of Clariant. A soft backing process is performed with respect to the substrate 10 at each of 110° C. and 100° C. for 1 minute and 30 seconds. A channel patterned mask and the substrate 10 are aligned and then a PR patterned substrate is exposed to ultraviolet rays with an intensity of 21 mWcm$^{-2}$ for 20 seconds with MDE-4000 of Midas and developed with an AZ 400 K developer of Clariant for 1 minute and 30 seconds. The PR patterned substrate is annealed on the hot plate at 180° C. for 15 minutes and then etched with a 6:1 buffered oxide etch solution of J. T Baker for a hard baking process. In this case, a substrate etching speed may be set to 0.8 μm/min and a depth of the channel 20 formed on the substrate 10 may be uniform as 50 μm. A center of the channel formed on the patterned substrate 10 is aligned with the hole 31 of the encapsulation layer 30 and then the substrate 10 and the encapsulation layer 30 may be thermally bonded with a weight of 200 g at 595° C. for 18 hours for encapsulation.

In order to stably bond the polyelectrolyte gel between the substrate 10 and the encapsulation layer 30 between both components, 3-(trimethoxysilyl)propyl methacrylate (TMSMA) mixed with acetic acid and methanol is treated with TMSMA:acetic acid:methanol=1:2:2 as a solution mixture ratio for 1 hour and then washed with methanol. After filling the channel 20 with a precursor solution of the pDADMAC gel, the channel 20 is aligned with a photo mask and exposed to ultraviolet light at an intensity of 21 mWcm$^{-2}$ for 20 seconds with MDE-4000 of Midas. Next, after filling the channel 20 with a precursor solution of the pSPA gel, the channel 20 is aligned with the photo mask and exposed to ultraviolet light at an intensity of 21 mWcm$^{-2}$ for 3 seconds with MDE-4000 of Midas. For example, the precursor of the pSPA gel is implemented as 1M 3-sulfo-propyl acrylate potassium salt (SPA), 4 wt % N,N'-methyl-enebisacrylamide (crosslinker, MBAAm), and 0.2 wt % Lithium phenyl-2,4,6-trimethylbenzoylphosphinate (LAP) and the precursor of pDADMAC is implemented as 3.96 M diallyl-dimethylammonium chloride (DADMAC), 1 wt % MBAAm, and 0.2 wt % LAP. The p type gel 22 and the n type gel 23 may be formed by such a photopolymerization method, but the present invention is not limited thereto and the preparation process may be changed according to the design. After the photopolymerization process, the open-junction ionic transistor 1 is washed with a KCl solution several times and stored in 0.1 M KCl solution for at least one day before characterization of the open-junction ionic transistor 1.

Hereinafter, a process in which the open-junction ionic transistor 1 operates according to the ion input will be described with reference to FIGS. 5 to 7.

Figure 5:
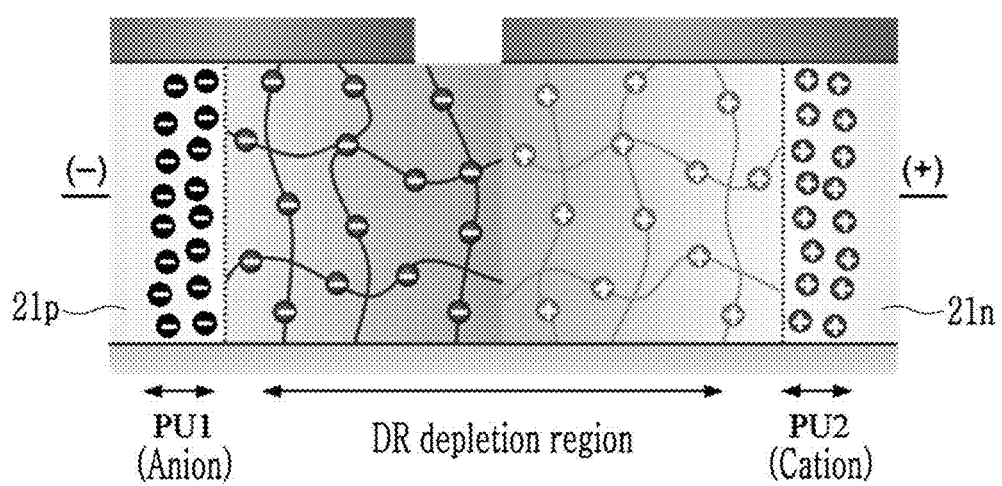
FIG. 5 is a diagram illustrating a reverse bias state of an open-junction ionic transistor according to an exemplary embodiment before ion input injection.

FIG. 5 is a diagram illustrating a reverse bias state of an open-junction ionic transistor according to an exemplary embodiment before ion input injection.

Figure 6:
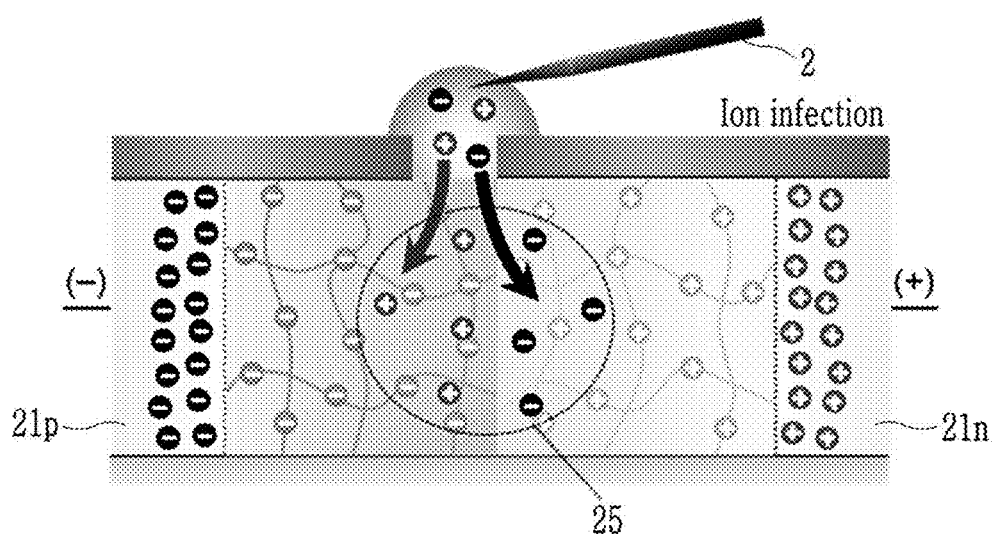
FIGS. 6 and 7 are diagrams illustrating ion movement in an open-junction ionic transistor depending on ion input in an open-junction ionic transistor according to an exemplary embodiment.
Figure 7:
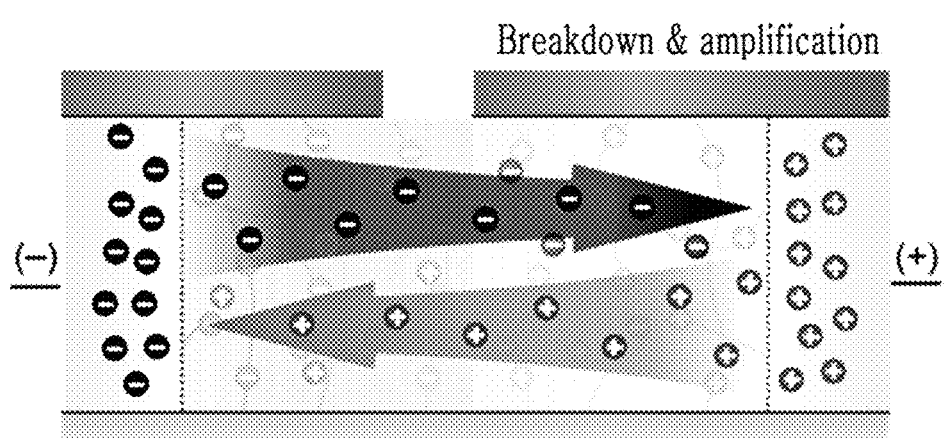

FIGS. 6 and 7 are diagrams illustrating ion movement in an open-junction ionic transistor depending on ion input in an open-junction ionic transistor according to an exemplary embodiment.

As regions illustrated in FIGS. 5 to 7, a boundary periphery among the reservoir 21, the p type gel 22, and then type gel 23 is illustrated in the channel 20 in order to describe an operation of the open-junction ionic transistor.

As illustrated in FIG. 5, negative voltage is applied to the reservoir 21 adjacent to the p type gel 22 and positive voltage is applied to the reservoir 23 adjacent to the n type gel 23 to become the reverse bias state. In the reverse bias state, a depletion region is formed based on the boundary of the p type gel 22 and the n type gel 23. For convenience of description, the reservoir 21 adjacent to the p type gel 22 is represented by '21*p*' and the reservoir 21 adjacent to the n type gel 23 is represented by '21*n*'. In the reverse bias state, by charge repulsion, anions increase at a boundary region PU1 of the reservoir 21*p* and cations increase at a boundary region PU2 of the reservoir 21*n*.

Next, as illustrated in FIG. 6, the ion input is injected into the channel 20 through the hole 31 by the ion injecting apparatus 2. Then, local charge neutralization occurs in a region 25.

After injection, ionic current peak which is similar to electronic breakdown current flows as illustrated in FIG. 7. In an ionic system, additional ions may be replenished. For example, the anions accumulated in the reservoir 21*p* flow to the reservoir 21*n* through the p type gel 22 and the n type gel 23 and the cations accumulated in the reservoir 21*n* flow to the reservoir 21*p* through the n type gel 23 and the p type gel 22. The ionic current peak is generated by the flows of the anions and the cations. In this case, as the ionic current peak is generated by more ions than the injected input ions, the ionic input signal is amplified and the ionic current peak is generated as an output signal. An additional flow of ions by a breakdown phenomenon is generated from the reservoirs 21*p* and 21*n*, and as a result, an amplification phenomenon occurs.

Hereinafter, an operating principle of the open-junction ionic transistor according to an exemplary embodiment will be described through a specific experimental example. In the experimental example, in order to measure the ionic current peak, an Ag/AgCl electrode may be positioned in at least one of the open hole 32 and the open hole 35 and at least one of the open hole 33 and the open hole 34.

First, whether the ion may be injected through the hole will be described.

Figure 8:
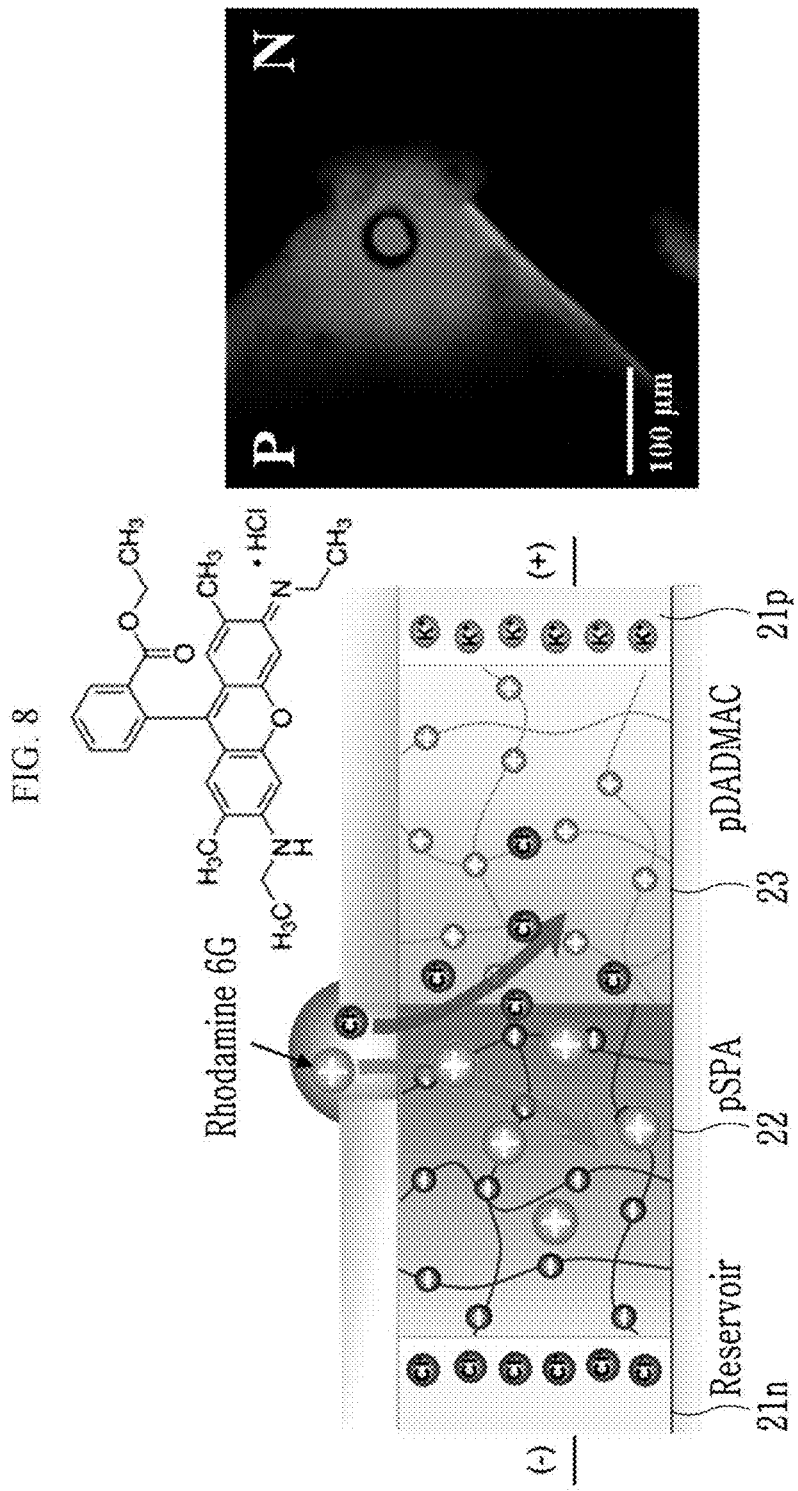
FIG. 8 is a diagram illustrating a state of an open-junction ionic transistor when a fluorescent cation solution is injected.

FIG. 8 is a diagram illustrating a state of an open-junction ionic transistor when a fluorescent cation solution is injected.

Figure 9:
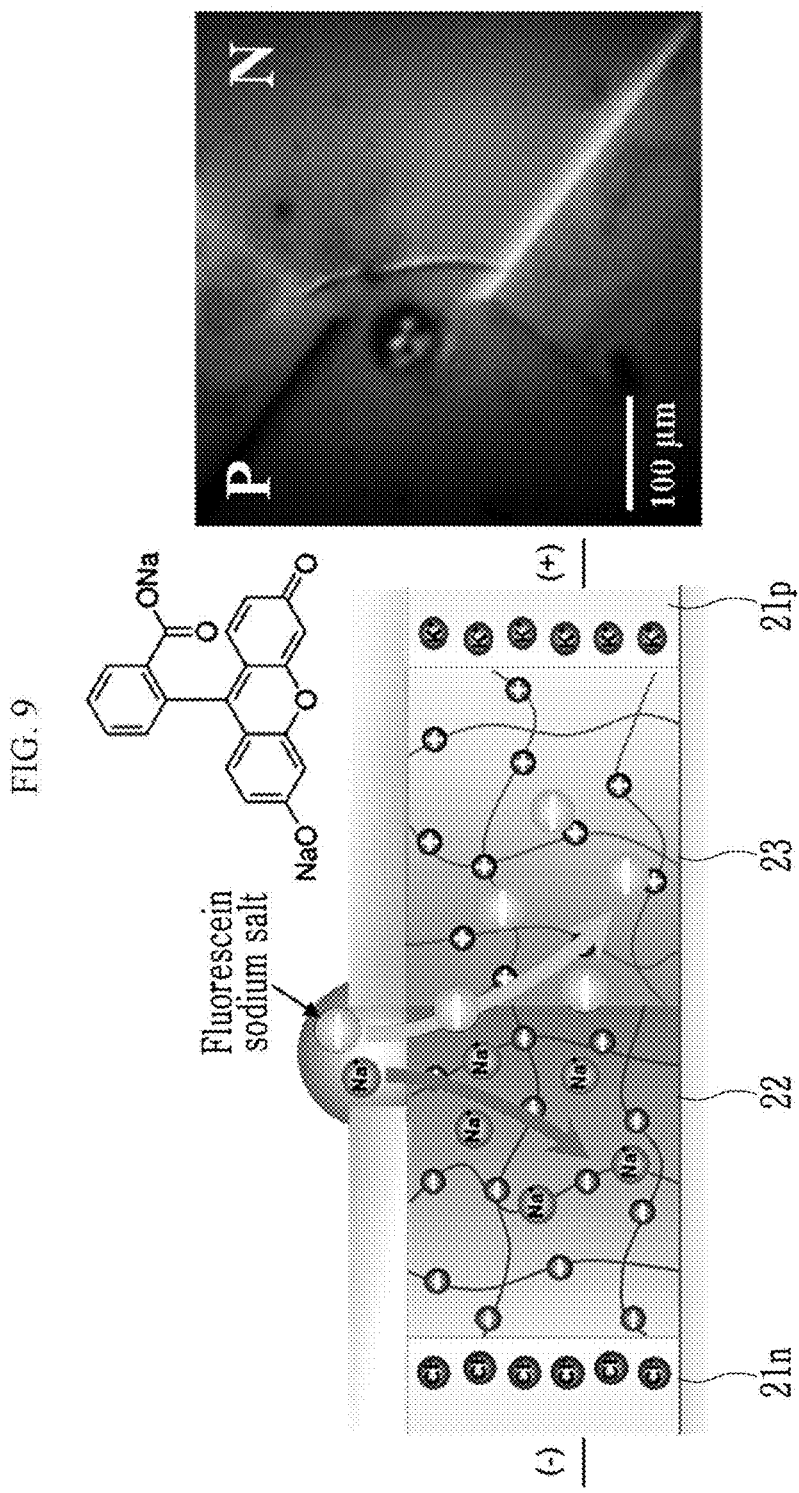
FIG. 9 is a diagram illustrating a state of an open-junction ionic transistor when a fluorescent anion solution is injected.

FIG. 9 is a diagram illustrating a state of an open-junction ionic transistor when a fluorescent anion solution is injected.

As illustrated in a left figure of FIG. 8, a positively charged fluorescent Rhodamine 6G solution (e.g., 10 μM Rhodamine 6G) is injected. Then, as illustrated in the right figure of FIG. 8, most green fluorescence is observed in the p type gel 22, i.e., a pSPA region. In the right figure of FIG. 8, only a contrast is displayed and green fluorescence is displayed brighter than the surroundings.

As illustrated in the left figure of FIG. 9, a positively charged fluorescent Fluorescein sodium salt solution (e.g., 10 μM Fluorescein sodium salt) is injected. Then, as illustrated in the right figure of FIG. 9, most red fluorescence is observed in the n type gel 23, i.e., a pDADMAC region. In the right figure of FIG. 9, only the contrast is displayed and red fluorescence is displayed brighter than the surroundings.

As such, as a result of observing fluorescent ion distribution in a device through a fluorescent microscope after injecting the positively charged Rhodamine 6G solution and the negatively charged Fluorescein sodium salt aquatic solution, respectively, it may be verified that each of the cations and the anions are injected into the p type gel 22 or the n type gel 23.

Subsequently, a real-time ion current change depending on ion signal injection is observed.

Figure 10A:
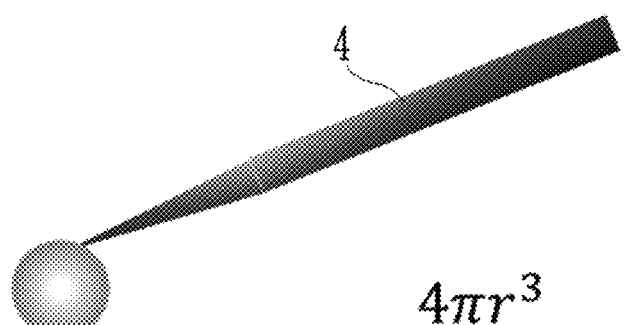
FIG. 10A is a diagram illustrating ion droplets formed during ion input injection.
Figure 10A:
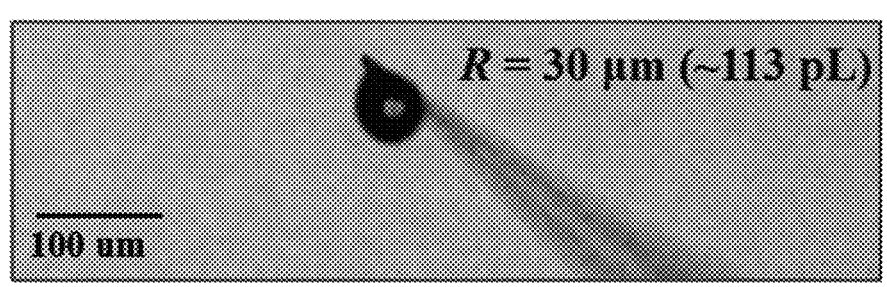

FIG. 10A is a diagram illustrating ion droplets formed during ion input injection.

As illustrated in FIG. 10A, a volume of the ion input may be calculated through measurement of diameters of ion droplets injected through a pico injector 4 (V=4Πr$^3$/3, r represents a radius of the droplet).

Figure 10B:
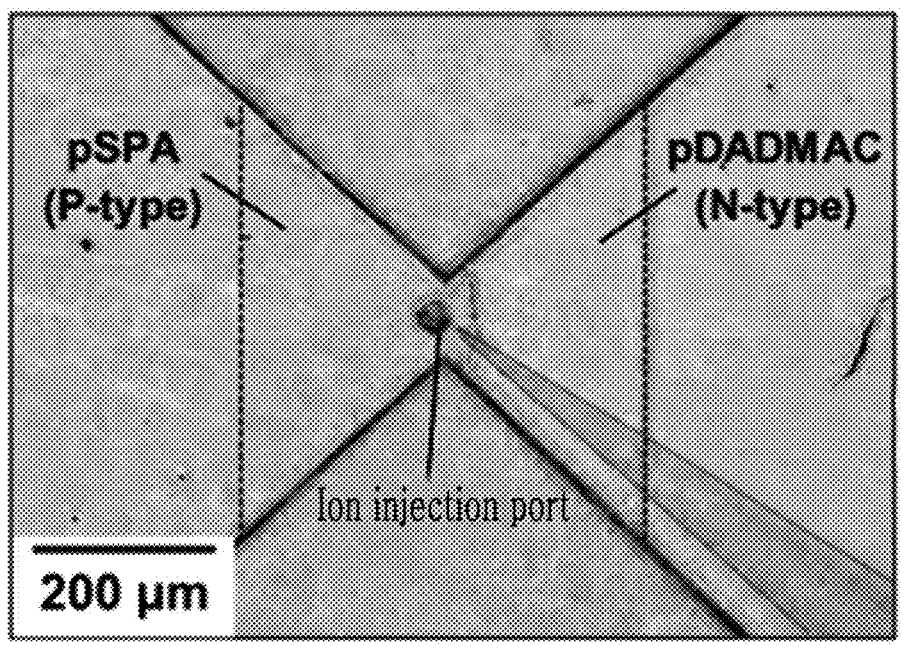
FIG. 10B is a diagram illustrating that ion input is injected into a hole through a pico injector.

FIG. 10B is a diagram illustrating that ion input is injected into a hole through a pico injector.

An ion injection amount may be accurately controlled through injection pressure and time control of the pico injector 4.

Figure 10C:
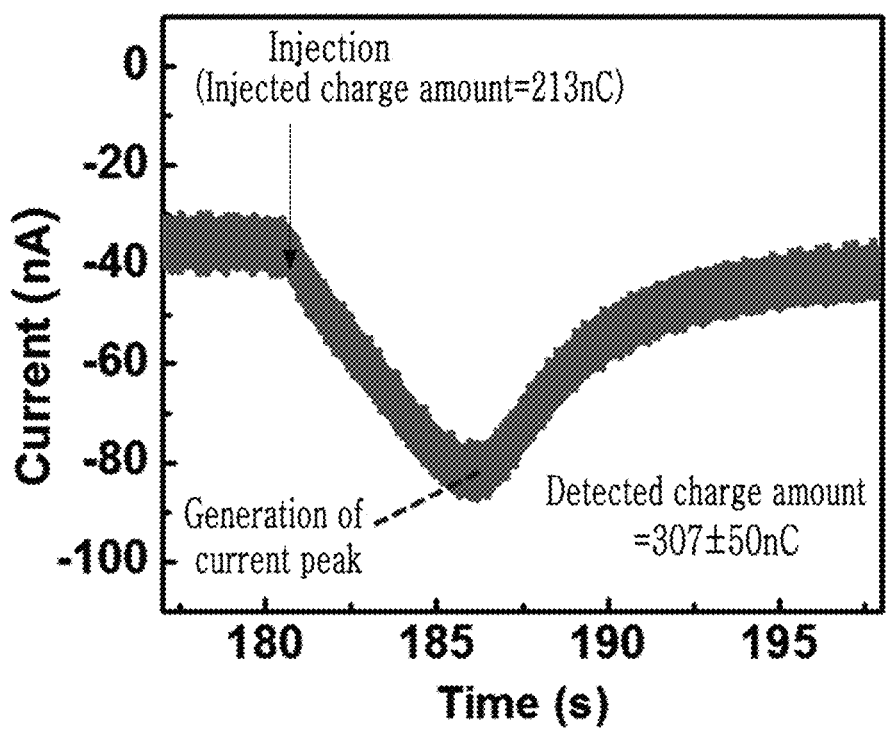
FIG. 10O is a current-time graph for ion current at the time of injecting KCl ion input.

FIG. 10C is a current-time graph for ion current at the time of injecting KCl ion input.

As illustrated in FIG. 10B, when the ion input is injected into a junction portion region of the p type gel 22 and the n type gel 23 while a sufficient depletion state is provided in the open-junction ionic transistor 1, it can be seen that the ionic current peak is generated as illustrated in FIG. 10C.

Further, more charge amount (307±50 nC) than a charge amount (216 nC) of the injected ion input is detected as a result of calculating the amount of charge though integration of the current-time graph illustrated in FIG. 10C. In other words, the ion input is amplified by an additional amplification phenomenon as well as sensing the injected ion input to generate the output.

Hereinafter, in an ion current waveform, current which flows on the open-junction ionic transistor is referred to as the ionic current peak and the ionic current peak has a waveform in which the ionic current peak sharply increases after injecting the ion input.

After the ion is injected, local electric charge neutralization occurs in the depletion region, and as a result, the following experimental is introduced in order to prove generation of ion current as breakdown current from the reservoir.

Selective fluorescent dyes that emit fluorescence by reaction with specific ions are used as the ion input.

Figure 11A:
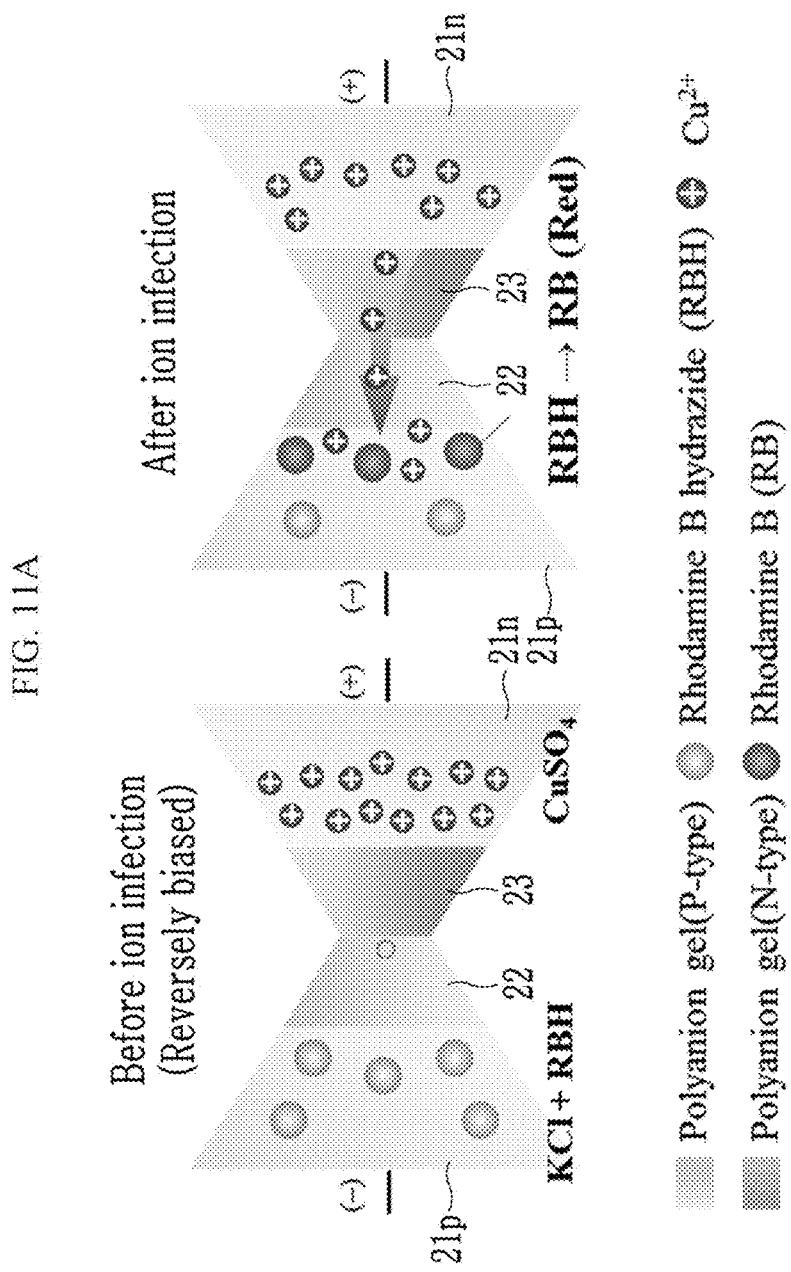
FIG. 11A is a diagram schematically illustrating ion current induced by $Cu^{2+}$ ion flux after ion injection and FIG. 11B is a fluorescent image through an experiment.
Figure 11B:
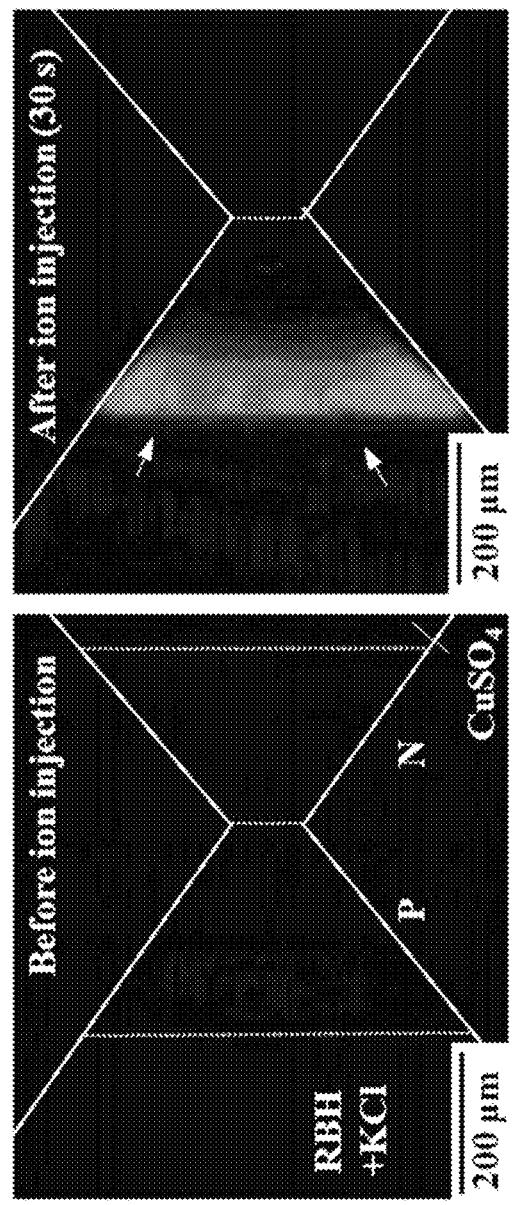

FIG. 11A is a diagram schematically illustrating ion current induced by $Cu^{2+}$ ion flux after ion injection and FIG. 11B is a fluorescent image through an experiment.

KCl including Rhodamine B hydrazide (RBH) is used in the pSPA side reservoir 21$p$ and $CuSO_4$ (0.1 M) is filled in the pDADMAC side reservoir 21$n$ and the reverse bias voltage is applied. In this case, 50 μM RBH may be used in a 0.1 M KCl reservoir 21 together with 0.1 M HEPES buffer solution (pH 7.0, 80%) and acetonitrile (20%).

In this state, the fluorescence is not almost detected due to charge repulsion between a fixed charge of the polyelectrolyte gel and counter mobile ions of the reservoirs 21$n$ and 21$p$.

When KCl is injected as the ion input, $Cu^{2+}$ cationic flux from the pDADMAC side reservoir 21$n$ reaches the reservoir 21$p$ through the polyelectrolyte gel and selective reaction of Rhodamine B hydrazide (RBH) and $Cu^{2+}$ ions occurs as illustrated in FIG. 11A. Then, Rhodamine B hydrazide (RBH) becomes Rhodamine B (RB) and red fluorescent light may be observed in the reservoir 21$p$ as illustrated in FIG. 11B. In FIG. 11B, only the contrast is illustrated, and as a result, a tinted region brighter than the surroundings is a region where red fluorescent light is observed.

Figure 12A:
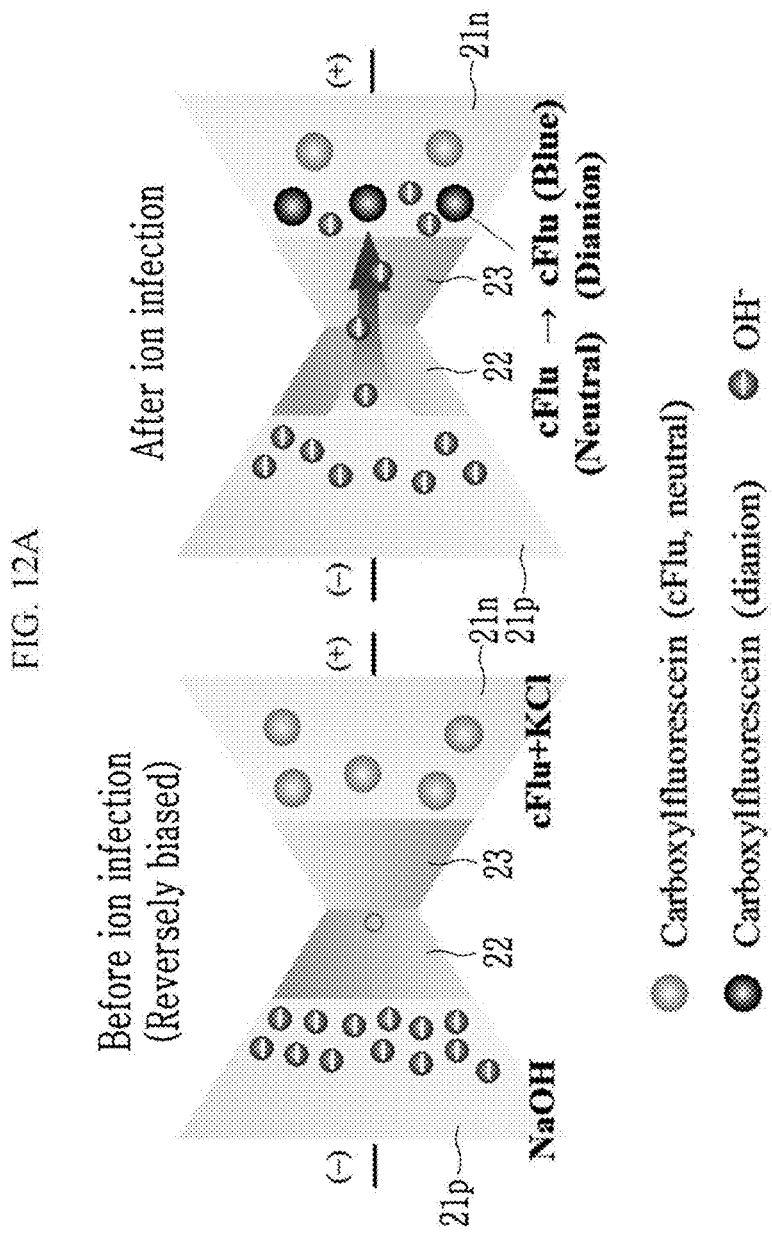
FIG. 12A is a diagram schematically illustrating ion current induced by $OH^-$ ion flux after ion injection and FIG. 12B is a fluorescent image through an experiment.
Figure 12B:
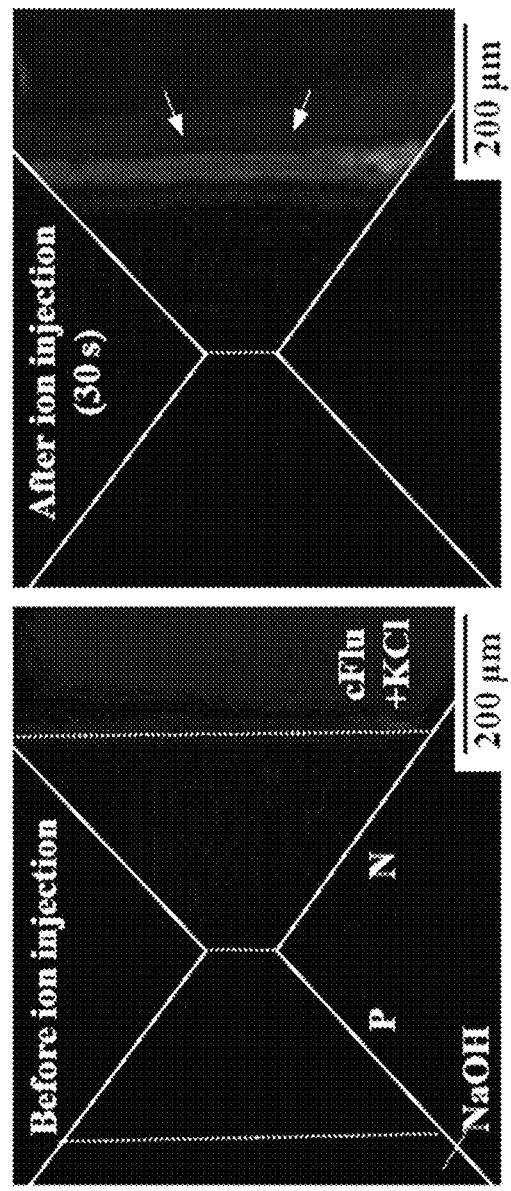

FIG. 12A is a diagram schematically illustrating ion current induced by $OH^-$ ion flux after ion injection and FIG. 12B is a fluorescent image through an experiment.

KCl including pH sensitive carboxylfluorescein (cFlu) (e.g., 50 μM cFlu) dyes is used in the pDADMAC side reservoir 21$n$ and NaOH (0.1 M) is used in the pSPA side reservoir 21$p$ and the reverse bias voltage is applied. In this state, the fluorescence is not almost detected due to charge repulsion between a fixed charge of the polyelectrolyte gel and counter mobile ions of the reservoirs 21$n$ and 21$p$.

When KCl is injected as the ion input in this state, $OH^-$ anionic flux from the pSPA side reservoir 21$p$ reaches the reservoir 21$n$ through the polyelectrolyte gel and $OH^-$ reaching the reservoir 21$n$ is selectively reacted with cFlu and neutral cFlu is converted into cFlu of Dianion as illustrated in FIG. 12A. Then, as illustrated in FIG. 12B, cyan fluorescent light may be observed in the reservoir 21$n$. In FIG. 12B, only the contrast is illustrated, and as a result, a tinted region brighter than the surroundings is a region where cyan fluorescent light is observed.

Fluorescent light of FIGS. 11B and 12B are measured by fluorescent microscope TE200U of Nikon.

Through the above experiment, it can be seen that additional breakdown ion current is generated by the breakdown phenomenon by the ion injection in the open-junction ionic transistor formed by junction of the p type gel 22 and the n type gel 23 according to an exemplary embodiment, and as a result, the ionic current peak is generated.

A factor which influences generation of the ionic current peak may at least include a concentration of the reservoir, a magnitude of the reverse bias voltage, types of the ion input and a reservoir ion, and a channel width.

First, a relationship between the concentration of the reservoir and the ionic current peak will be described.

Figure 13A:
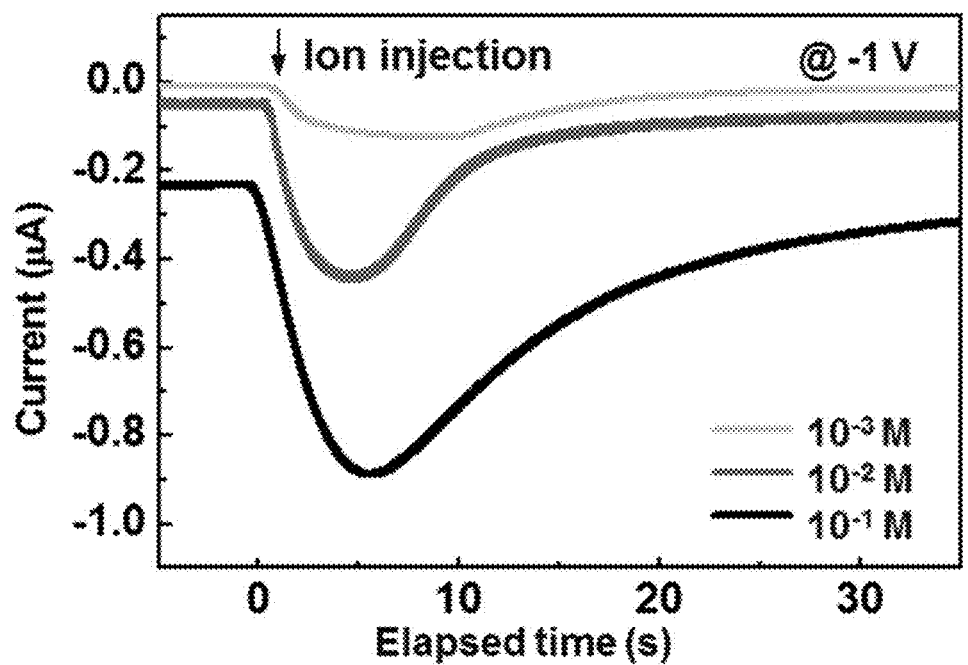
FIG. 13A is a graph showing ionic current peak with an increase in reservoir concentration.

FIG. 13A is a graph showing ionic current peak with an increase in reservoir concentration.

Figure 13B:
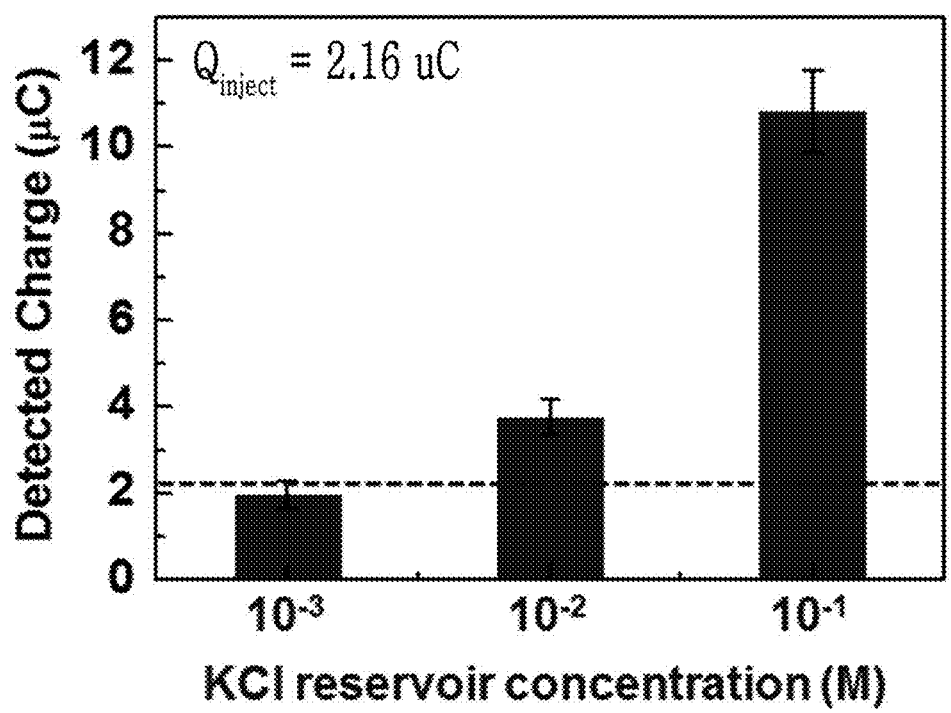
FIG. 13B is a graph showing a detected charge amount with an increase in reservoir concentration.

FIG. 13B is a graph showing a detected charge amount with an increase in reservoir concentration.

In FIG. 13B, the dotted line represents the amount of charge of the injected input ions.

As illustrated in FIG. 13A, it can be seen that when the concentration of KCl of the reservoir 21 increases to 1 mM, 0.01 M, and 0.1 M in order while the ion input is fixed to KCl 0.1 M 113 pL (Q is approximately 2.16 uC), a peak level of the ionic current peak gradually increases. Further, it can be seen that the charge amount of the detected ion signal also increases in the order of 1.93 uC, 3.75 uC, and 10.81 uC. In this case, the charge amount is a value calculated through integration of the ionic current peak on a current-time curve for 1 minute after the ion input is injected. When the KCl concentration of the reservoir 21 is 1 mM, the charge amount detected from the ionic current peak is measured 1.93 μC and this is similar to the injected ion input. However, it can be seen that as the KCl concentration of the reservoir 21 increases to 0.01 M and 0.1 M, the ionic current peak increases and the detected charge amount also increases to 3.75 μC and 10.81 μC, respectively.

As such, it can be seen that the concentration of the ion which exists in the reservoir at the time of injecting the ion input is one of major factors of the amplification phenomenon and simultaneously, it can be seen that an amplification ratio of the open-junction ionic transistor may be controlled through controlling the concentration of the reservoir.

Next, a relationship between the reverse bias voltage and the amplification phenomenon will be described.

Figure 14A:
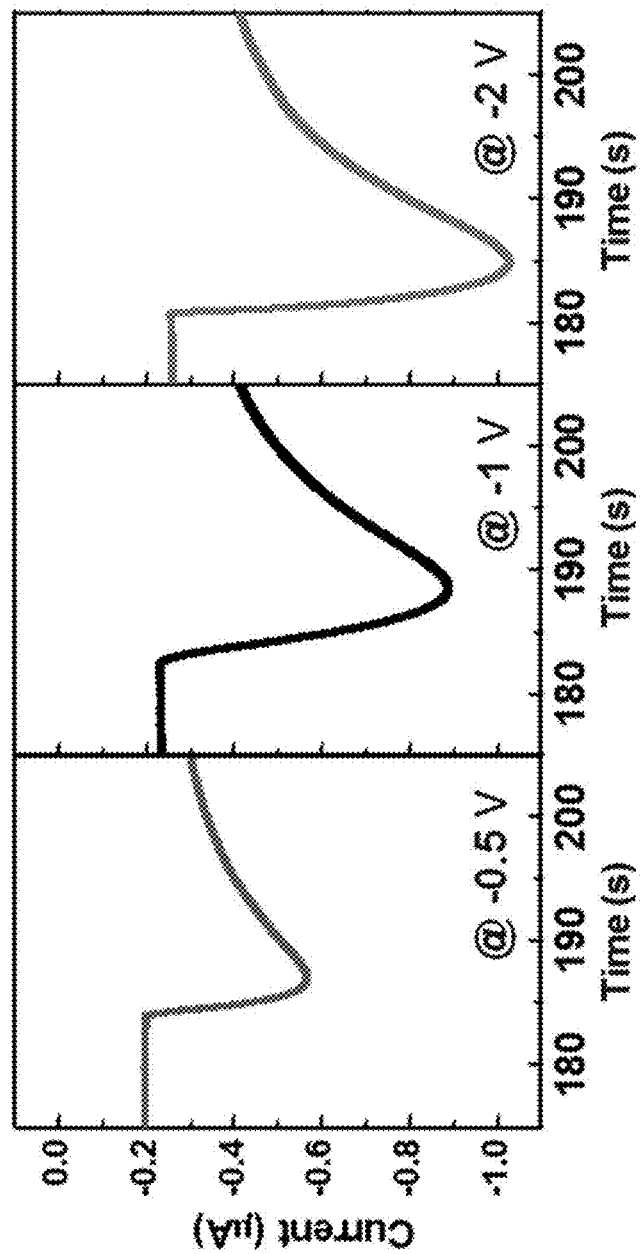
FIG. 14A is a graph showing ionic current peak with an increase in reverse bias voltage.

FIG. 14A is a graph showing ionic current peak with an increase in reverse bias voltage.

Figure 14B:
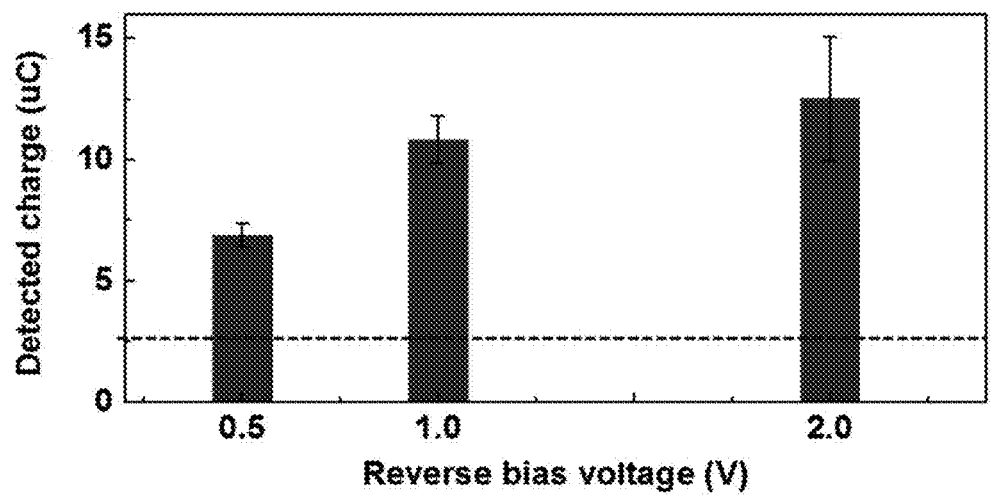
FIG. 14B is a graph showing a detected charge amount with an increase in reverse bias voltage.

FIG. 14B is a graph showing a detected charge amount with an increase in reverse bias voltage.

In FIG. 14B, the dotted lines represent the ion charge amount of the injected ion input and the reservoir 21 is KCl 0.1 M.

As illustrated in FIG. 14A, it can be seen that as the reverse bias voltage applied to the open-junction ionic transistor 1 increases in order of −0.5 V, −1V, and −2 V, the ionic current peak and the peak level increase and waveforms thereof become sharp. When the reverse bias voltage applied to the open-junction ionic transistor 1 increases, a field which acts on ion movement of the reservoir 21 increases, and as a result, an amplification effect increases As illustrated in FIG. 14B, a charge amount value amplified and detected also increases together with the increase of the reverse bias voltage in the order of −0.5 V, −1V, and −2 V.

Subsequently, a relationship between the ion input and the type of each reservoir and the amplification phenomenon will be described.

Table 1 is a table showing a valid radius (Bare) for each cation and a valid radius for each hydrated cation, and a valid radius of anion $Cl^-$ and valid radius of hydrated $Cl^-$.

TABLE 1

| ION | Bare (nm) | Hydrated (nm) |
|-----|-----------|---------------|
| $Li^+$ | 0.094 | 0.382 |
| $Na^+$ | 0.117 | 0.358 |
| $K^+$ | 0.149 | 0.331 |
| $Cl^-$ | 0.164 | 0.332 |

As seen in Table 1, when the cation is hydrated and water molecules are attached to the cation, the radius increases in the order of cations of $K^+$, $Na^+$, and $Li^+$.

Figure 15A:
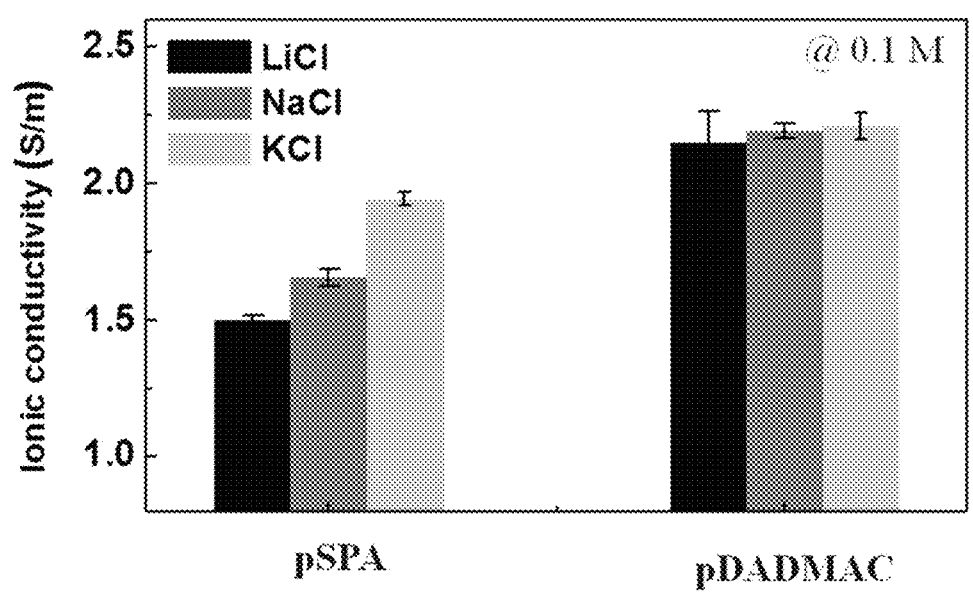
FIG. 15A is a graph showing ion conductivity of an ion solution in polyelectrolyte gels of a p-type gel and an n-type gel.

FIG. 15A is a graph showing ion conductivity for each cation in polyelectrolyte gels of a p-type gel and an n-type gel.

As illustrated in FIG. 15A, a conductivity difference depending on a radius difference of cation in the polyelectrolyte gel of the P type gel 22 occurs. It can be seen that the radius is smaller, the conductive is more excellent (KCl>NaCl>LiCl).

Figure 15B:
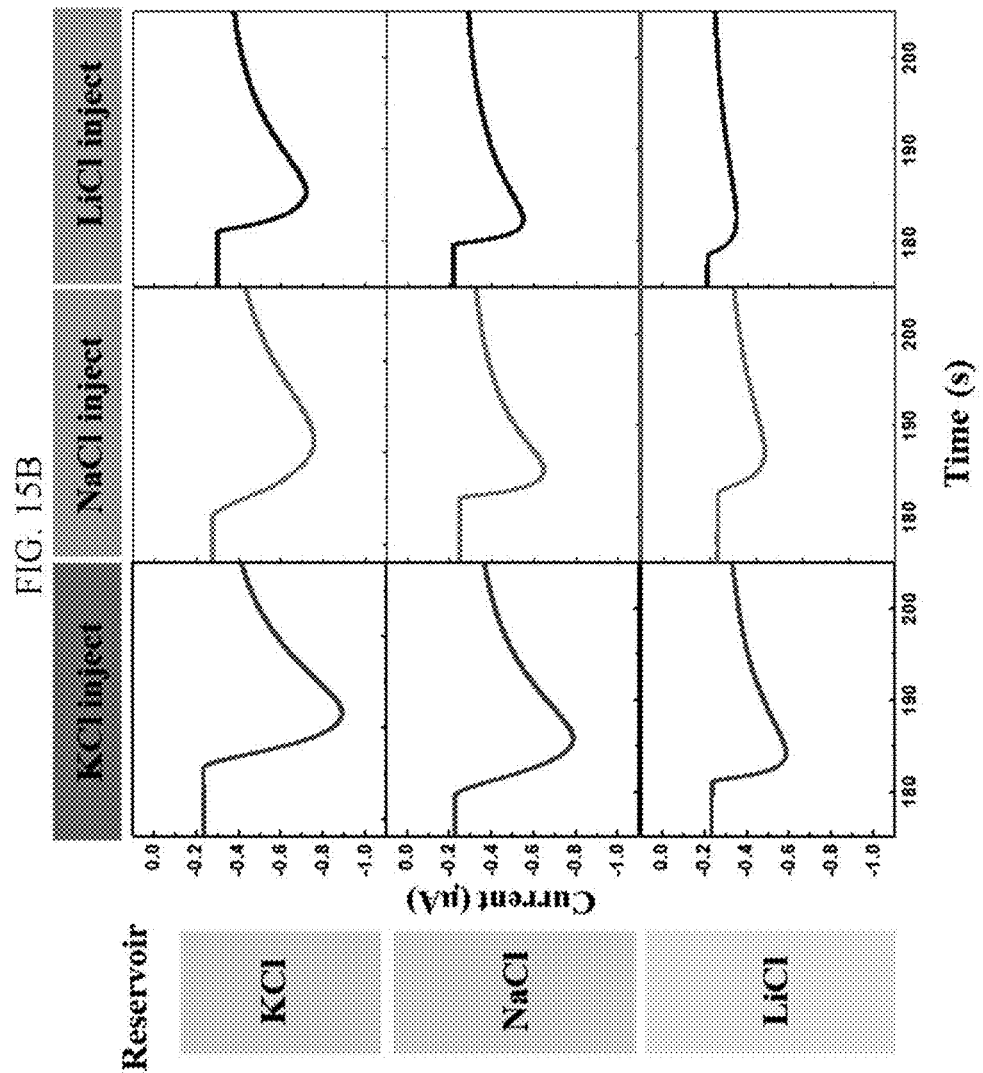
FIG. 15B is a diagram illustrating a waveform of ionic current peak according to a type of each of a reservoir and ion input.

FIG. 15B is a diagram illustrating a waveform of ionic current peak according to a type of each of a reservoir and ion input.

In a vertical direction, an ion type of the reservoir is differentiated and in a horizontal direction, the type of ion input is differentiated.

Figure 15C:
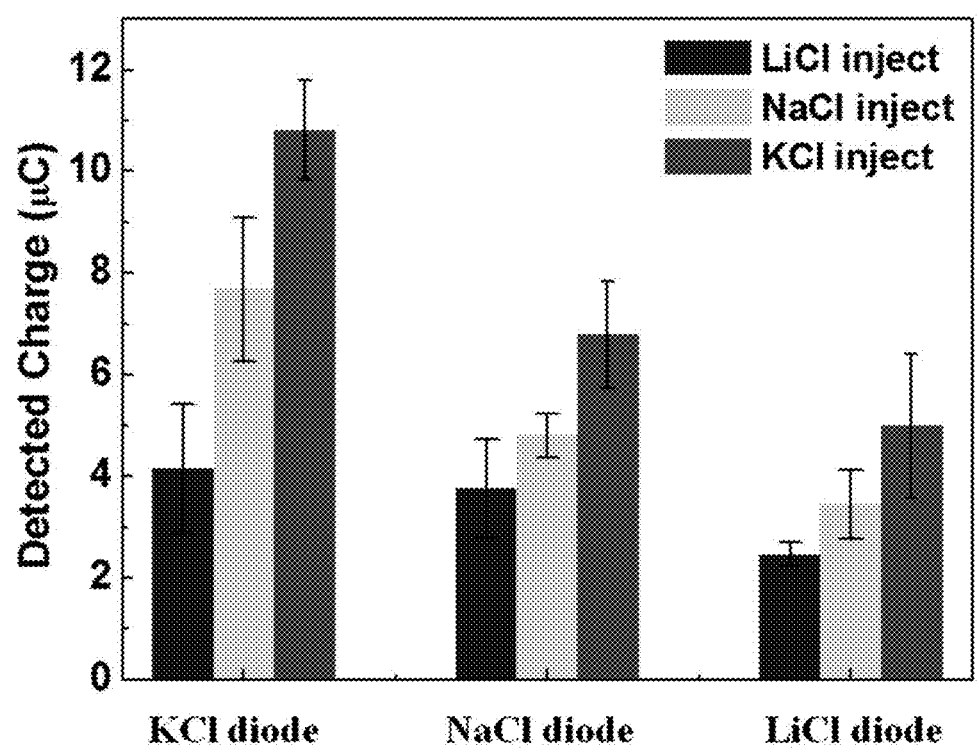
FIG. 15C is a diagram illustrating a detected charge amount according to a type of each of a reservoir and ion input.

FIG. 15C is a diagram illustrating a detected charge amount according to a type of each of a reservoir and ion input.

As illustrated in FIGS. 15B and 15C, it can be seen that when the ion type of the reservoir is KCl, the ionic current peak, the peak level, and the detected charge amount are larger than those of other ions. Specifically, with respect to each of ion inputs KCl, NaCl, and LiCl, when the ion of the reservoir is KCl, the ionic current peak and the peak level thereof, and the detected charge amount are larger as compared with those when the ion of the reservoir is NaCl and LiCl.

Further, it can be seen that when the ion input is KCl, the ionic current peak and the peak level thereof are largest as compared with those when the ion input is other ion input. Specifically, with respect to each of KCl, NaCl, and LiCl as the ion type of the reservoir, when the ion input is KCl, the ionic current peak and the peak level thereof, and the detected charge amount are larger as compared with those when the ion type of the reservoir is NaCl and LiCl.

As such, when the cation constituting the reservoir is changed, the amplification effect is highest in a KCl based ionic transistor and gradually decreases in the order of NaCl and LiCl. Further, in the case of the ion input, the detected charge amount value gradually decreases in the order of KCl, NaCl, and LiCl. When the cation is hydrated, the valid radius increases in the order of $K^+$, $Na^+$, and $Li^+$ while the water molecules are attached, and as a result, a conductivity change depending on a difference in cation radius may occur in the p type gel and additional ionic current peak may be suppressed.

Last, a relationship between widths of the polyelectrolyte gels of the p type gel and the n type gel and the amplification phenomenon will be described. Hereinafter, the width of the P type and N type polyelectrolyte gels constituting the open-junction ionic transistor is referred to as a transistor width.

Figure 16B:
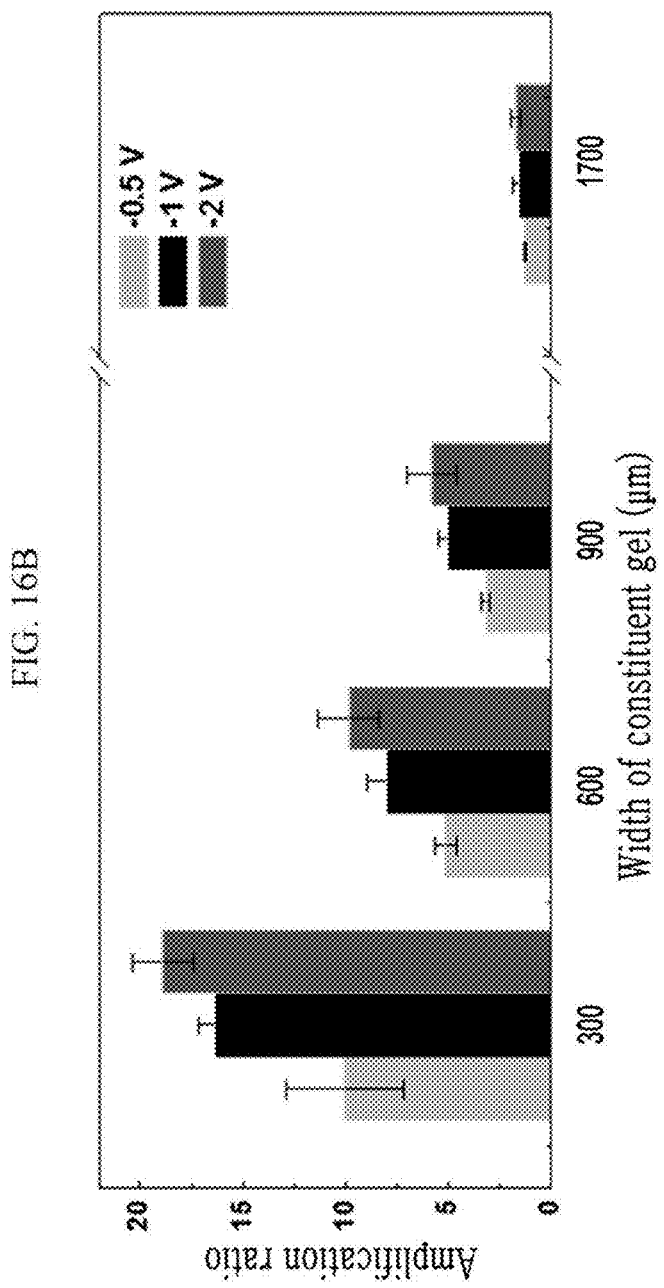

FIG. 16A is a waveform diagram illustrating ionic current peak according to a change in transistor width and a change in reverse bias voltage and FIG. 16B is a graph showing an amplification ratio according to a change in transistor width and a change in reverse bias voltage.

In the reservoir and the ion input, under the same condition of 0.1 M KCl, the transistor width is changed to 300 to 1700 μm and the reverse bias voltage is changed to −0.5 V to −2 V. As shown to FIG. 16A, the transistor widths td1, td2, td3, and td4 are 300 μm, 600 μm, 900 μm, and 1700 μm. Under each reverse bias voltage condition, the ionic current peak increases as the transistor width is shorter. In other words, as the transistor width is shorter, the amplification effect increases. When the transistor width increases up to 1700 μm, the amplification effect decreases to be close to the injected ion input.

As the reverse bias voltage increases to −0.5 V to −2 V together with the width of the transistor, an amplitude of the ionic current peak increases and the ionic current peak becomes sharper. Under a condition in which the transistor width is 150 μm and the reverse bias voltage is −2 V, the charge amount of injected K+ and Cl− ions may be enhanced to 18.9 times, i.e., the amplification ratio may be enhanced to 18.9 times.

In terms of the amplification ratio, width of the transistor may be a factor which exerts the largest influence on the amplification phenomenon as compared with other factors. The reason is that as the width of polyelectrolyte gel decreases, an applied electric field increases and the distance of resistive part decreases. These two factors highly contribute to transport of reservoir ions in the open-junction ionic transistor.

The transistor width influences even an operating speed in addition to the amplification effect. In other words, as the transistor width is shorter, the operating speed also increases. The operating speed means a rapidity degree at which the amplification phenomenon occurs by the ion input. As the operating speed is faster, a time required until current reaches a predetermined ratio is reduced before the ion is injected after the ionic current peak reaches a peak.

Figure 17A:
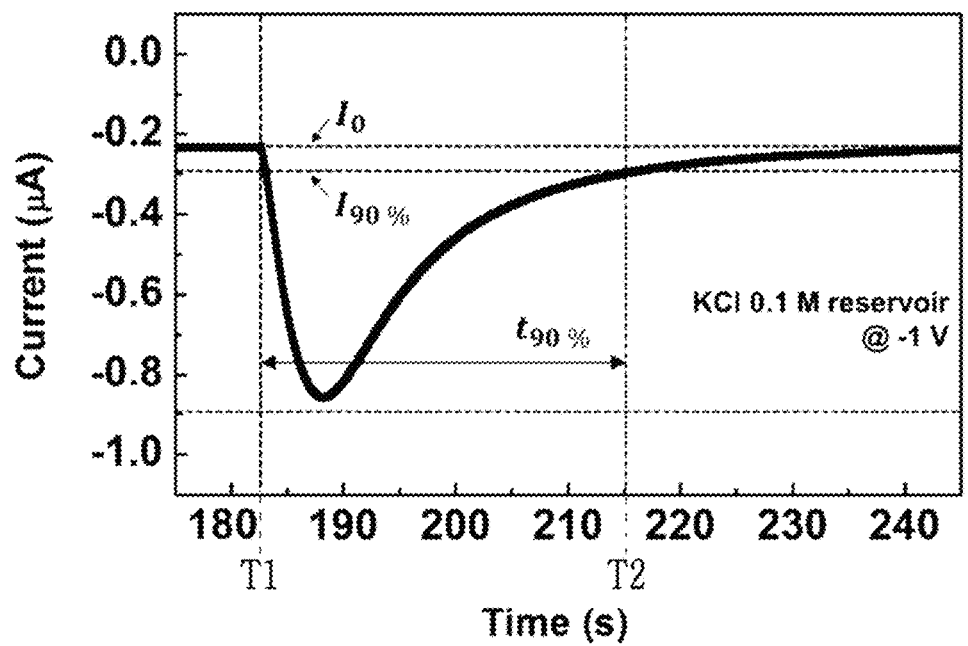
FIG. 17A is a waveform diagram of ionic current peak and FIG. 17B is a graph showing an operating speed constant according to an ionic transistor width and reverse bias voltage.
Figure 17B:
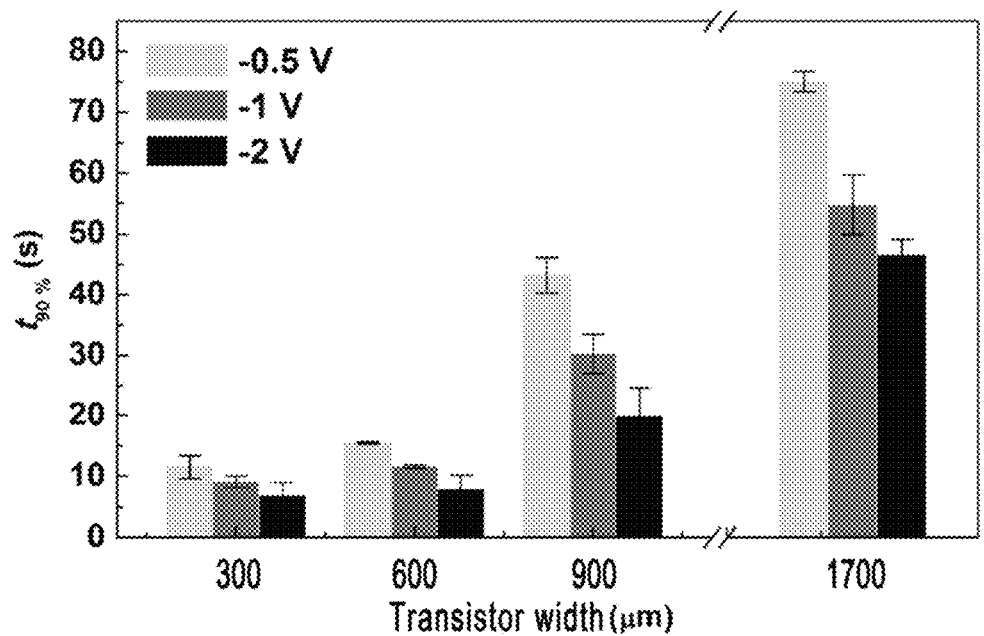

FIG. 17A is a waveform diagram of ionic current peak and FIG. 17B is a graph showing an operating speed constant according to a transistor width and reverse bias voltage.

A time is detected up to a time T2 when current is recovered up to 90% of the current before injecting the ion input from an ion input time T1 in order to quantify the operating speed and the time is referred to as an operating speed constant.

As illustrated in FIG. 17B, it can be seen that as the transistor width decreases, the operating speed constant decreases and as the reverse bias voltage increases, the operating speed constant decreases. Specifically, when the transistor width is 300 μm and the reverse bias voltage is −2 V, the operating speed constant may be improved to 6 seconds.

In the present disclosure, all chemical reagents used in an exemplary embodiment and various experimental examples for describing an open-junction ionic transistor according to an exemplary embodiment are used without additional refinement. For example, 3-sulfopropyl acrylate potassium salt (SPA), diallyldimethylammonium chloride (DADMAC), N,N'-methylenebisacrylamide (crosslinker, MBAAm), 3-(trimethoxysilyl)propyl methacrylate (TMSMA), methanol, acetic acid, fluorescein sodium salt, rhodamine 6G, rhodamine B hydrazide (RBH), HEPES, acetonitrile, and carboxyfluorescein (cFlu) are purchased from SIGMA Aldrich and Lithium phenyl-2,4,6-trimethyl-benzoylphosphinate (LAP) is each purchased from Tokyo Chemical.

A signal transfer system of a biological region is primarily based on ion transport. For this reason, in order to acquire a biological signal, capacitive coupling between electrons and ionic charges is used or a bonded electroactive polymer is used to acquire the biological signal through a micro electrode in the related art. However, fundamental mismatch of signal carriers of an electrical device and the biological region makes direct communication difficult, which causes high impedance on an interface between humans and machines.

In the related art, in the case of the ion device, in order to sense the ion signal transferred in the biological region, an electrode is used, which is made of metal or a conductive polymer such as poly(3,4-ethylenedioxythiophene):poly(styrenesulfonate) (PEDOT:PSS). Such an indirect sensing system inevitably has a limit in sensing a minute ion signal transferred in a biotic system. Further, since transmittance of the ion signal is controlled by gate voltage of an additional electrode, when cells in a biological medium may be exposed an undesired electrical stimulus when the ion device is activated. Further, a weak ion signal needs to be amplified, which is acquired in the biological region for effective signal processing. However, an ion having a relatively larger scale than the electron is low in mobility and recombination of carriers does not occur in the ion system, and as a result, a very long time is required for reaching the depletion state from the reverse bias state.

The open-junction ionic transistor according to an exemplary embodiment may amplify the ion input. Accordingly, in the ion system, the minute ion signal through signal amplification may be detected. Therefore, a biological integrating device may be provided, which may sense and transmit a signal in the biological system. Such a biological integrating device may be applied in a wide range of monitoring neurological or cardiac activity or delivering medical drugs for treatment.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

10: Substrate
20: Channel
21: Reservoir
22: p type gel
23: n type gel
30: Encapsulation layer
31: Hole
32-35: Open hole

What is claimed is:

1. An open-junction ionic transistor comprising:
a substrate;
a p type gel formed by a polyelectrolyte gel on the substrate;
an n type gel formed by the polyelectrolyte gel on the substrate and having one surface contacting one surface of the p type gel;
a first reservoir contacting the other surface of the p type gel;
a second reservoir contacting the other surface of the n type gel; and
an encapsulation layer covering the p type gel, the n type gel, the first reservoir, and the second reservoir,
wherein on the encapsulation layer, an opening for injecting an ion input is formed at a location corresponding to a boundary region contacting the p type gel and the n type gel, and
wherein when reverse bias voltage is applied between the p type gel and the n type gel, the ion input injected through the opening is amplified and ionic current peak is generated.

2. The open-junction ionic transistor of claim 1, wherein: ions are added from the first reservoir and the second reservoir, respectively and the ion input is amplified.

3. The open-junction ionic transistor of claim 1, wherein: as the reverse bias voltage increases, the ionic current peak increases.

4. The open-junction ionic transistor of claim 1, wherein: the ionic current peak is changed according to a type of ion input.

5. The open-junction ionic transistor of claim 4, wherein: when cations of the ion input are hydrated, as a radius of the hydrated cation is smaller, the ionic current peak increases.

6. The open-junction ionic transistor of claim 1, wherein: the ionic current peak is changed according to ion concentrations of the first reservoir and the second reservoir.

7. An open-junction ionic transistor comprising:
a p type gel which is a polyelectrolyte;
an n type gel which contacts one side of the p type gel and which is the polyelectrolyte;
a first reservoir contacting the other side of the p type gel facing the one side of the p type gel; and
a second reservoir contacting the other side of the n type gel facing one side thereof contacting the p type gel,
wherein an opening for injecting an ion input is formed at a location corresponding to a boundary region contacting the p type and the n type gel, and
wherein a depletion region by reverse bias voltage is formed in the interface of the p type gel and the n type gel and ionic current peak is generated by additional ions introduced from the first reservoir and the second reservoir by the ion input injected into the depletion region through the opening.

8. The open-junction ionic transistor of claim 7, wherein: ions are added from the first reservoir and the second reservoir, respectively and the ion input is amplified.

9. The open-junction ionic transistor of claim 7, wherein: as the reverse bias voltage increases, the ionic current peak increases.

10. The open-junction ionic transistor of claim 7, wherein: the ionic current peak is changed according to a type of ion input.

11. The open-junction ionic transistor of claim 10, wherein: when cations of the ion input are hydrated, as a radius of the hydrated cation is smaller, the ionic current peak increases.

12. The open-junction ionic transistor of claim 7, wherein: the ionic current peak is changed according to ion concentrations of the first reservoir and the second reservoir.

13. The open-junction ionic transistor of claim 7, wherein: the ionic current peak is changed according to ion types of the first reservoir and the second reservoir.

14. The open-junction ionic transistor of claim 13, wherein: when the cations of the first reservoir and the second reservoir are hydrated, as the radius of the hydrated cation is smaller, the ionic current peak increases.

15. The open-junction ionic transistor of claim 7, wherein: as widths of the p type gel and the n type gel are smaller, the ionic current peak increases.

16. The open-junction ionic transistor of claim 7, wherein: as the widths of the p type gel and the n type gel are smaller, an operating speed increases.

17. The open-junction ionic transistor of claim 7, further comprising:
an encapsulation layer covering the p type gel, the n type gel, the first reservoir, and the second reservoir,
wherein the ion input is injected through an opening formed on the encapsulation layer.

18. The open-junction ionic transistor of claim 17, wherein:
a location of the opening is positioned in a region corresponding to an interface contacting the p type gel and the n type gel.

19. An open-junction ionic transistor comprising:
a reservoir;
a p type gel which is a polyelectrolyte positioned in the reservoir; and
an n type gel which is positioned in the reservoir and which is a polymer electrolyte contacting one side of the p type gel,
wherein an opening for injecting an ion input is formed at a location corresponding to a boundary region contacting the p type and the n type gel,
wherein a depletion region by reverse bias voltage is formed in the p type gel and the n type gel and ionic current peak is generated by additional ions introduced from the reservoir by the ion input injected into the depletion region through the opening, and
the p type gel and the n type gel are polyanionic hydrogel or polymer backbones of the p type gel having fixed negative charges and the n type gel having fixed positive charges.

20. The open-junction ionic transistor of claim 19, wherein:
the p type gel is composed by any one of poly 3-sulfopropyl acrylate potassium salt, poly vinylsulfonic acid (pVSA), poly styrene sulfonic acid (pSS), and poly 2-acrylamide-2-methyl-1-propanesulfonic acid (pAMPSA), and poly acrylic acid (pAAc), hyaluronic acid (HA), alginate, and
the n type gel is composed by any one of poly diallyldimethylammonium chloride, poly N-[3-(N,N-dimethylamino)propyl] acrylamide methyl chloride quarternary (pDMAPAA-Q), and poly(2-[acryloyloxy ethyl] trimethyl ammonium chloride (pAETMAC), chitosan.

* * * * *